(12) United States Patent
Ujimoto et al.

(10) Patent No.: US 7,533,936 B2
(45) Date of Patent: May 19, 2009

(54) VEHICLE SEAT ASSEMBLY

(75) Inventors: Takushi Ujimoto, Fuchu-cho (JP); Terumi Akazawa, Osaka (JP); Teiji Hiyori, Fuchu-cho (JP); Keisuke Iida, Fuchu-cho (JP); Tomonori Ohtsubo, Fuchu-cho (JP); Hiroki Uemura, Fuchu-cho (JP)

(73) Assignees: Mazda Motor Corporation, Hiroshima (JP); Delta Kogyo Co., Ltd., Hiroshima (JP); Toyo Seat Co., Ltd., Osaka (JP)

( * ) Notice: Subject to any disclaimer, the term of this patent is extended or adjusted under 35 U.S.C. 154(b) by 84 days.

(21) Appl. No.: 11/892,160

(22) Filed: Aug. 20, 2007

(65) Prior Publication Data

US 2008/0048477 A1     Feb. 28, 2008

(30) Foreign Application Priority Data

Aug. 24, 2006 (JP) ............................. 2006-228397
Aug. 24, 2006 (JP) ............................. 2006-228398
Aug. 24, 2006 (JP) ............................. 2006-228399
Aug. 24, 2006 (JP) ............................. 2006-228400

(51) Int. Cl.
*B60N 2/00* (2006.01)
*B60N 2/02* (2006.01)

(52) U.S. Cl. ............... 297/344.13; 297/341; 297/344.1; 296/65.13

(58) Field of Classification Search ............... 297/341, 297/344.1, 216.16, 216.18, 344.13, 344.14; 296/65.13, 65.16, 65.14, 65.15

See application file for complete search history.

(56) References Cited

U.S. PATENT DOCUMENTS

| 2,795,265 | A | * | 6/1957 | Albrecht | ..................... 297/341 |
| 4,423,904 | A | * | 1/1984 | Crawford | ..................... 297/341 |
| 4,714,227 | A | * | 12/1987 | Holm et al. | ............ 297/344.14 |
| 6,488,337 | B1 | * | 12/2002 | De Voss et al. | ......... 297/344.13 |
| 2005/0109555 | A1 | | 5/2005 | Ohtsubo et al. | |

FOREIGN PATENT DOCUMENTS

| EP | 1 533 190 B1 | 5/2006 |
| FR | 2 589 342 | 5/1987 |
| JP | 62-116324 | 5/1987 |
| JP | 2005-145405 | 6/2005 |

* cited by examiner

*Primary Examiner*—Anthony D Barfield
(74) *Attorney, Agent, or Firm*—Studebaker & Brackett PC; Donald R. Studebaker

(57) ABSTRACT

A vehicle seat assembly comprises a coupling member 12 coupling a front end of a seat-cushion frame 2 to an upper rail 11, a rear link member 23 provided in a rear end of the seat-cushion frame 2, and a support member 24 provided on the side of a vehicle body to support the rear link member 23. The rear link member 23 includes a pivoted portion 26 pivotally supported by the upper rail 11, a coupled portion 28 coupled to the rear end of the seat-cushion frame 2, and an engaged portion engaged with the support member 24. The support member 24 includes a sliding drive portion (sliding groove 33) which slidably supports the engaged portion of the rear link member 23 to allow the rear link member 23 to be swingingly displaced in conjunction with a longitudinal movement of the seat-cushion frame 2, so as to move the coupled portion 28 in an upward/downward direction to drivingly lift and lower the rear end of the seat-cushion frame 2. The vehicle seat assembly of the present invention can effectively a height position of a seat cushion in conjunction with an operation of adjusting a longitudinal position of an occupant seat in conformity to occupant's physique or the like.

13 Claims, 22 Drawing Sheets

VEHICLE SEAT ASSEMBLY

BACKGROUND OF THE INVENTION

1. Field of the Invention

The present invention relates to a vehicle seat assembly comprising a seat-cushion frame supported movably in a frontward/rearward direction of a vehicle body along a pair of right and left seat slide rails mounted on a floor portion of the vehicle body.

2. Description of the Background Art

Heretofore, there has been known a vehicle seat assembly comprising an occupant seat, and a pair of right and left rectilinear slides (slide rails) which supports the occupant seat movably in a frontward/rearward direction (i.e., longitudinal direction) of a vehicle body and each of which includes a lower track member (lower rail) fixed to a floor panel in an occupant compartment and an upper track member (upper rail) slidably supported along the lower track member, wherein each of the rectilinear slides is constructed on a liner which is fixed to the lower track member and formed to have a vertical wing-shaped sidewall, and the occupant seat includes a seat cushion having a base (rear) end attached onto a rear spindle supported by a lug fixed to the upper track member, and a front end with a lower surface attached onto a spindle interlockingly connected to a front end of a lever arm which has a central portion pivotally supported by a spindle fixed to an upper portion of the upper track member of the slide, and a rear free end supporting a pin or roller adapted to be moved along an arc-shaped window formed in the vertical wing-shaped sidewall, whereby a tilting angle of the seat cushion is automatically changed as the seat cushion of the occupant seat is slidingly displaced in the longitudinal direction of the vehicle body along the rectilinear slides, as disclosed in JP 62-116324A (Hereinafter referred to "Patent Publication 1").

Specifically, as shown in FIG. 23, in the vehicle seat moving mechanism disclosed in the Patent Publication 1, the lever arm 84 is disposed below the front end of the seat cushion 81 in such a manner that the central portion thereof is pivotally supported by a lug 83 supported by a front end of the rectilinear slide 82. The front end of the lever arm 84 is pivotally supported by a lug 85 fixed to a lower surface of a front end of the seat cushion 81, and the rear end of the lever arm 84 is slidably engaged along the arc-shaped window 88, i.e., a guide groove having a downwardly-concaved central portion, which is formed in the vertical wing (vertical wing-shaped sidewall) 87 of the lower track member (lower rail) 86. When the seat cushion 81 is moved frontwardly from a rearmost position S3 indicated by the one-dot chain line toward an intermediate position S2 indicated by the thick line, along the lower track member which is mounted on the vehicle body with a frontwardly-upward inclination, the rear end of the lever arm 84 is guided and moved downwardly by the arc-shaped window 88 engaged therewith, and thereby the lever arm has a standing posture. Thus, the front end of the seat cushion 81 is pushed upwardly by the lever arm 84, so as to allow a seating surface of the seat cushion 81 to have a frontwardly-upward inclination. Then, when the seat cushion 81 is further moved frontwardly from the intermediate position S2 toward a frontmost position S1 indicated by the thin line, the lever arm 84 is moved to have a lying posture, and thereby the front end of the seat cushion 81 is moved downwardly to reduce an inclination angle of the seating surface to a value equal to that at the rearmost position S3.

In the vehicle seat assembly as disclosed in the Patent Publication 1, tilting means comprising the arc-shaped window 88 formed in the vertical wing 87 and the lever arm 84 having the rear end slidably engaged with the arc-shaped window 88 is associated with the front end of the seat cushion 81 in such a manner as to be operable, in conjunction with the longitudinal (frontward/rearward) movement of the seat cushion 81, to vertically displace the front end of the seat cushion 81 about the rear spindle 89 disposed below a rear end of the seat cushion 81. This mechanism makes it possible to change the inclination angle of the seating surface, and vertically displace a so-called "hip point" which is a position of a hip joint of an occupant (typically driver) when the occupant sits on the seating surface, from H1 to H3 or H3 to H1, along an upwardly-convexed arc-shaped line Ma, in conformity to seated heights of occupants J1 to J3, so as to allow respective visual points I1 to I3 of the occupants J1 to J3 seated in the seat cushion 81 to come closer to an optimum line L to some extent.

On the other hand, in the above mechanism based on the lever arm 84 which is operable, in conjunction with the longitudinal movement of the seat cushion 81, to vertically displace the front end of the seat cushion 81 so as to change the inclination angle of the seating surface, it is difficulty to significantly change the hip point (H1 to H3) for the occupants J1 to J3, unless the lever arm 84 is designed to ensure a large lever ratio, for example, by extremely increasing a length of the lever arm 84, and the large lever ratio is more likely to cause a problem about instability in support of the seat cushion 81. The reason is as follows. Even if the front end of the seat cushion 81 is vertically displaced by the lever arm 84, a vertical position of the hip point (H1 to H3) located on a rear side of the front end cannot be so largely changed. Thus, the respective visual points I1 to I3 of the occupants J1 to J3 can be brought closer to the optimum line L in conformity to seated heights of the occupants J1 to J3, only if the lever ratio of the lever arm 84 is set at an extremely large value. Inevitably, the lever arm 84 having such a large lever ratio is more likely to cause wobbling at the front end of the seat cushion 81 supported thereby. Therefore, the above mechanism has a problem about difficulty in adjusting the hip point simply and adequately in conjunction with the longitudinal (frontward/rearward) movement of the seat cushion 81, in conformity to occupant's physique.

In an operation of moving the occupant seat frontwardly when an occupant having a body height fairly less than the average (hereinafter referred to as "short occupant") sits thereon, if the inclination angle of the seat cushion 81 is reduced to bring the seat cushion 81 closer to a horizontal posture while correspondingly changing an inclination angle of a seat back to bring the seat back closer to a vertical posture, an upper body of the occupant can be moved toward a standing posture to allow an eye point of the occupant to conform to the optimum line L. However, the vehicle seat lifter mechanism disclosed in the Patent Publication 1 is designed such that the inclination angle of the seat cushion 81 is set to the same value at the frontmost position S1 and the rearmost position S3 of the occupant seat. Thus, this mechanism is incapable of obtaining a function of adjusting an eye point by changing the respective inclination angles of the seat cushion 81 and the seat back, specifically a function of displacing an upper body of the short occupant J1 to a frontwardly-inclined posture to allow the visual point I1 of the occupant J1 to conform to the frontwardly-inclined optimum line L. In this respect, there remains the need for improvement.

SUMMARY OF THE INVENTION

In view of the above circumstances, it is an object of the present invention to provide a vehicle seat assembly capable of effectively adjusting a height position of a seat cushion so as to adequately ensure a field of view of an occupant, in conjunction with an operation of adjusting a longitudinal (frontward/rearward) position of an occupant seat in conformity to the physique of the occupant.

In order to achieve this object, according to the present invention (original claim 1), a vehicle seat assembly which comprises: a pair of right and left seat slide rails including a pair of right and left lower rails each fixed onto a floor portion of an occupant compartment to extend in a longitudinal direction of a vehicle body, and a pair of right and left upper rails slidably supported along corresponding ones of the lower rails; and a pair of right and left seat-cushion frames each supported by a corresponding one of the seat slide rails in such a manner as to be moved in the longitudinal direction together with a corresponding one of the upper rails. The vehicle seat assembly is characterized by comprising a coupling member coupling a front end of each of the seat-cushion frames to a corresponding one of the upper rails, a rear link member provided in a rear end of each of the seat-cushion frames, and a vehicle body-side support member provided on the side of the vehicle body to support the rear link member. The rear link member includes a pivoted portion pivotally supported by the upper rail, a coupled portion coupled to the rear end of the seat-cushion frame, and an engaged portion engaged with the vehicle body-side support member. The vehicle body-side support member includes a sliding drive portion which slidably supports the engaged portion of the rear link member to allow the rear link member to be swingingly displaced about the pivoted portion in conjunction with a longitudinal movement of the seat-cushion frame, so as to move the coupled portion of the rear link member in an upward/downward direction to drivingly lift and lower the rear end of the seat-cushion frame.

With the vehicle seat assembly set forth in the above, when the seat-cushion frames of the seat cushion are moved in the longitudinal direction, each of the rear link members is swingingly displaced about the pivoted portion to drivingly lift/lower a rear end of the seat cushion, as the engaged portion of the rear link member is slidingly displaced along the sliding drive portion of the vehicle body-side support member. This provides advantages of allowing a hip point corresponding to a position of a hip joint of an occupant sitting on the seat cushion to be effectively moved in an upward/downward direction, while variously changing a movement locus of the hip point according to a configuration/arrangement of the sliding drive portion and a pattern/mode of the sliding displacement of the rear link member.

These and other objects, features and advantages of the present invention will become apparent upon reading of the following detailed description along with the accompanying drawings.

DESCRIPTION OF THE PREFERRED EMBODIMENTS

With reference to the accompanying drawings, the present invention will be described based on an embodiment thereof. As to a bilaterally-symmetric structure, the following description will be made primarily about only one of the right or left structure or component for facilitating a clear understanding of the present invention.

First Embodiment

Figure 1:
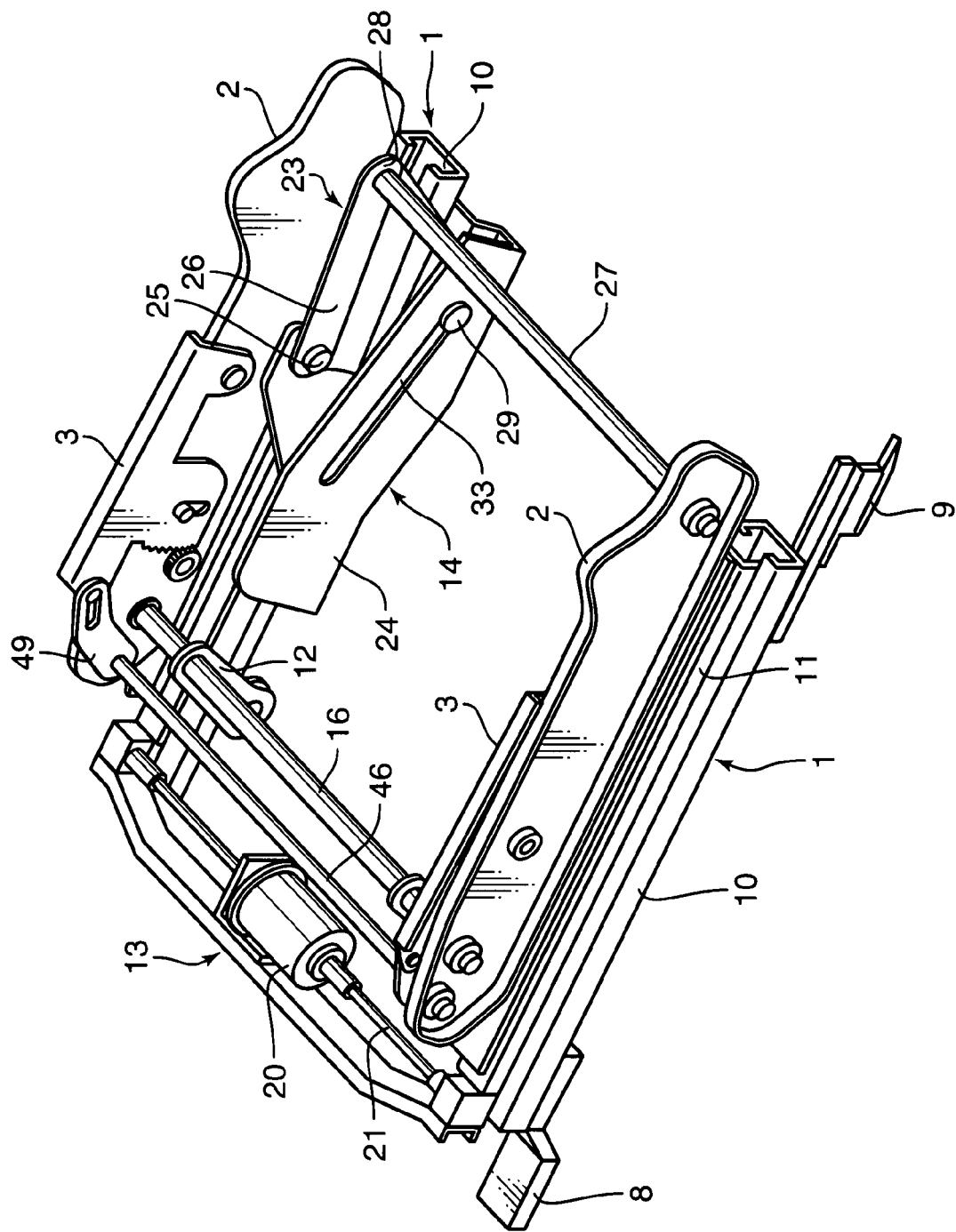
FIG. 1 is a perspective view showing a vehicle seat assembly according to a first embodiment of the present invention.
Figure 2:
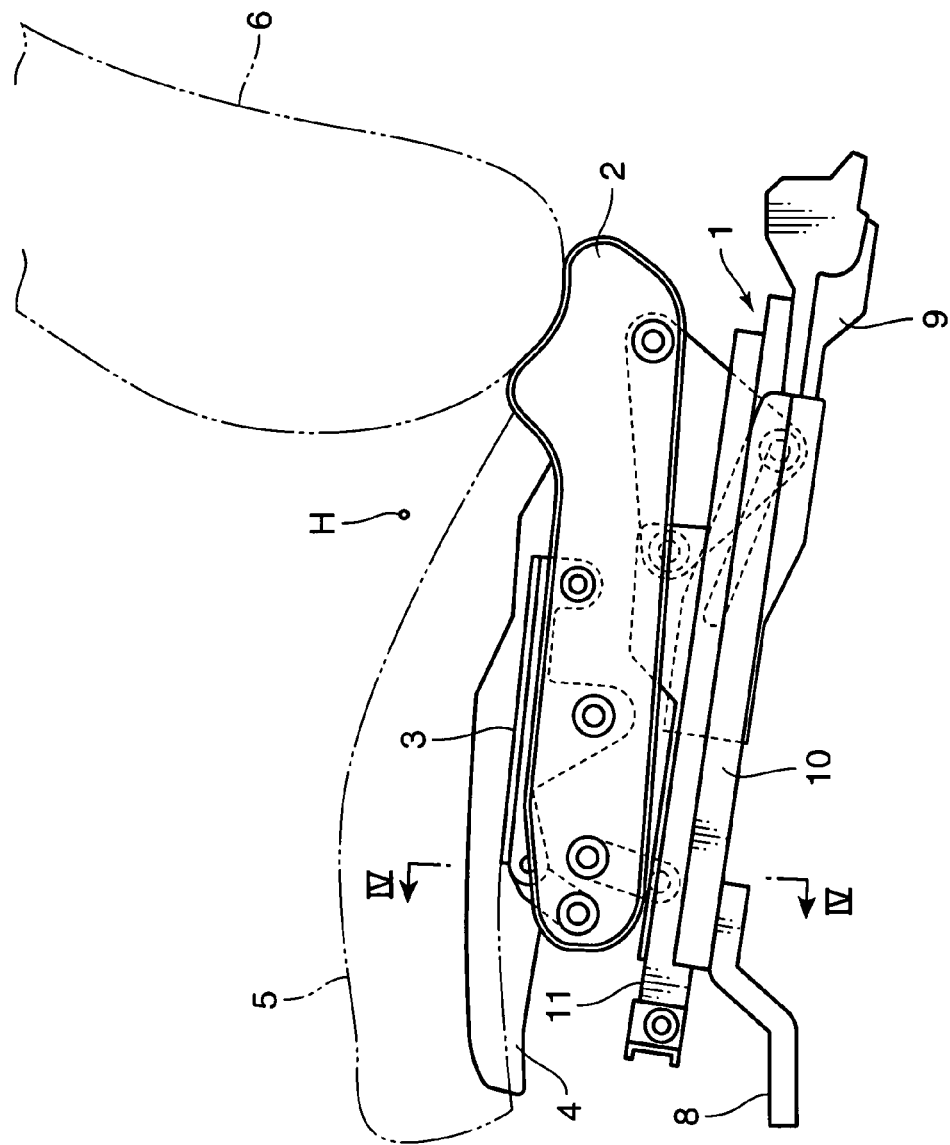
FIG. 2 is a side view of the vehicle seat assembly in FIG. 1.
Figure 3:
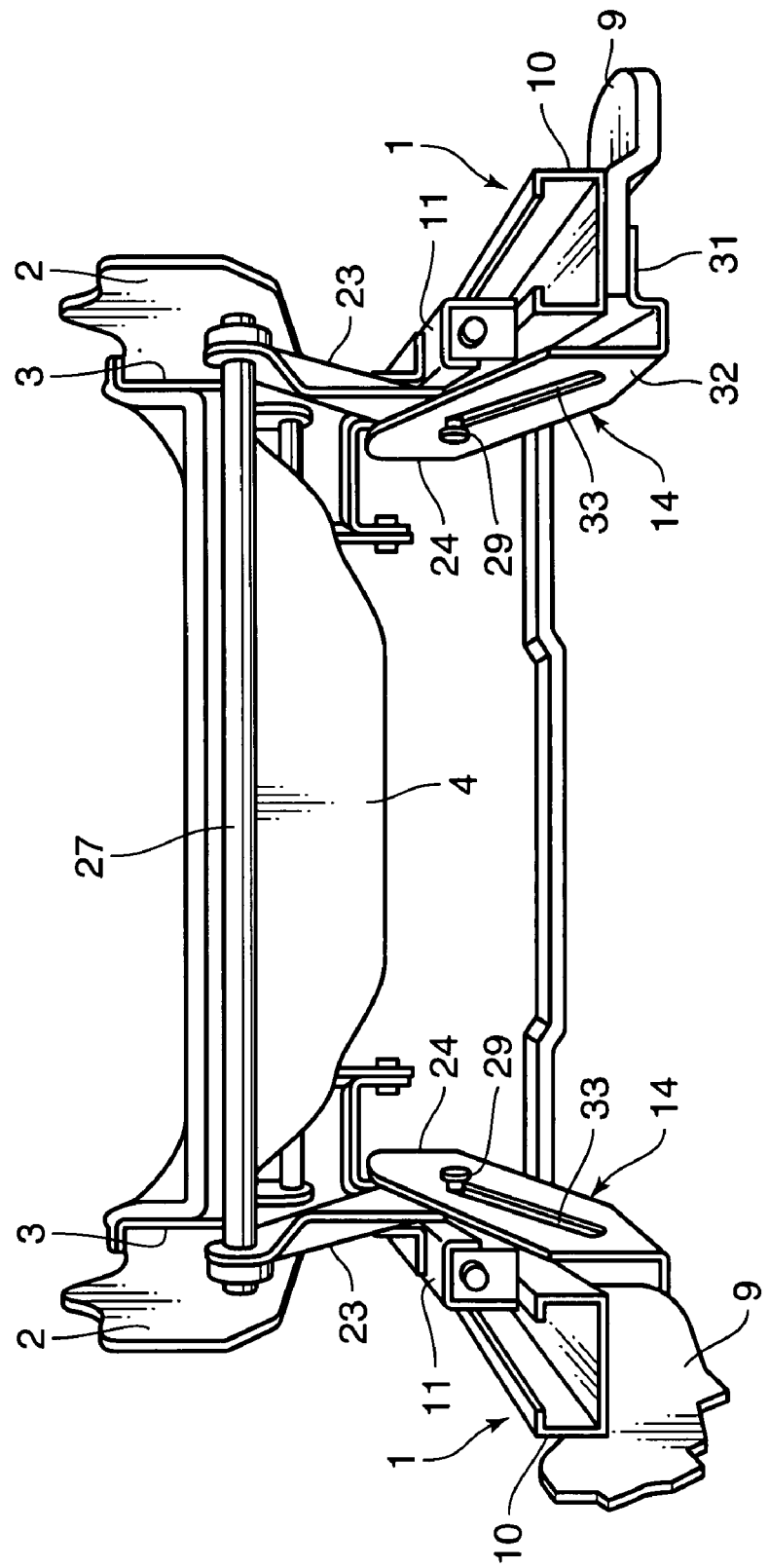
FIG. 3 is a rear view of the vehicle seat assembly in FIG. 1.

FIGS. 1 to 12 show a vehicle seat assembly according to a first embodiment of the present invention. As shown in FIGS. 1 to 3, this vehicle seat assembly comprises a pair of right and left seat slide rails 1 mounted on a floor of an occupant compartment to extend in a frontward/rearward (i.e., longitudinal) direction of a vehicle body, a pair of right and left seat-cushion frames 2 supported by corresponding ones of the seat slide rails 1 in a longitudinally movable manner, a pair of right and left seat-cushion support members 3 disposed in upper regions of corresponding ones of the seat-cushion frames 2, a seat-cushion pan 4 supported by the seat-cushion support members 3, and an occupant seat, such as a driver seat. The occupant seat includes a seat cushion 5 held by the seat-cushion pan 4 in such a manner that a lower portion thereof is covered by the seat-cushion pan 4, a seat back 6 disposed to extend upwardly from rear ends of the seat-cushion frames 2, and a headrest (not shown) located at an upper end of the seat back 6.

Each of the seat slide rails 1 comprises a lower rail 10 which is formed, for example, of a sectionally C-shaped member having an open upper surface, and fixed on a floor portion of the vehicle body through a pair of front and rear support legs 8, 9 each having a different height in such a manner as to have a frontwardly-upward inclination, and an upper rail 11 slidably supported along the lower rail 10. Each of the seat-cushion frames 2 has a front end coupled to a corresponding one of the upper rails 11 through a coupling member comprising a coupling link member 12 which is a single link arm. A seat drive mechanism 13 is disposed in front of respective front ends of the lower rails 10 to drive the upper rails 11 and the seat-cushion frames 2 in such a manner as to slidingly displace them in the longitudinal direction of the vehicle body along the respective lower rails 10. Further, a lifting/lowering drive mechanism 14 is disposed around a rear region of each of the lower rails 10 to drivingly lift and lower the rear end of each of the seat-cushion frames 2 in conjunction with a longitudinal (frontward/rearward) movement of a corresponding one of the upper rails 11.

Figure 4:
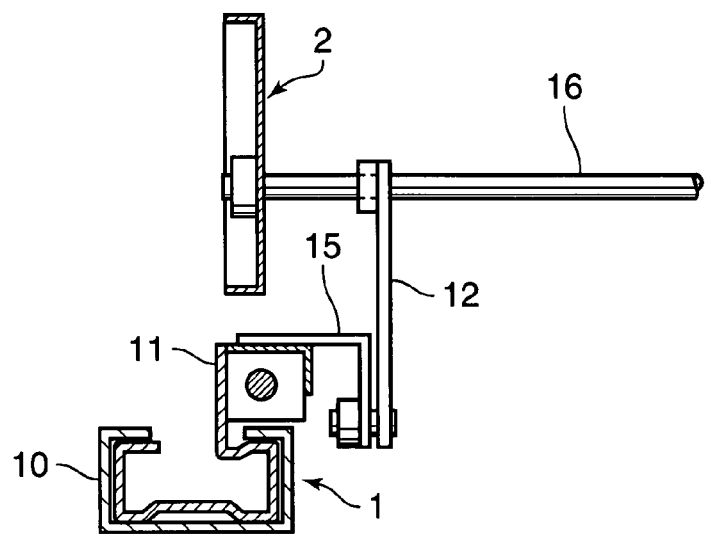
FIG. 4 is a sectional view taken along the line IV-IV in FIG. 2.

As shown in FIG. 4, the coupling link member 12 has a lower end pivotally supported by a support bracket 15 provided on the side of an inner surface of a front end of the upper rail 11, and an upper end pivotally supporting a front connection member 16 which is disposed to connect between respective front regions of the right and left seat-cushion frames 2, and formed, for example, of an arm-shaped member. Thus, when lifting/lowering drive mechanism 14 drivingly lifts and lowers the rear end of the seat-cushion frame 2 and a rear end of the seat cushion 5 in conjunction with the longitudinal (frontward/rearward) movement of the seat-cushion frame 2 along the lower rail 10, as described in detail later, the coupling link member 12 can be swingingly displaced about the pivoted lower end to allow the seat-cushion frame 2 to be swingingly displaced about the front connection member 16 pivotally supported by the upper end of the coupling link member 12.

Figure 5:
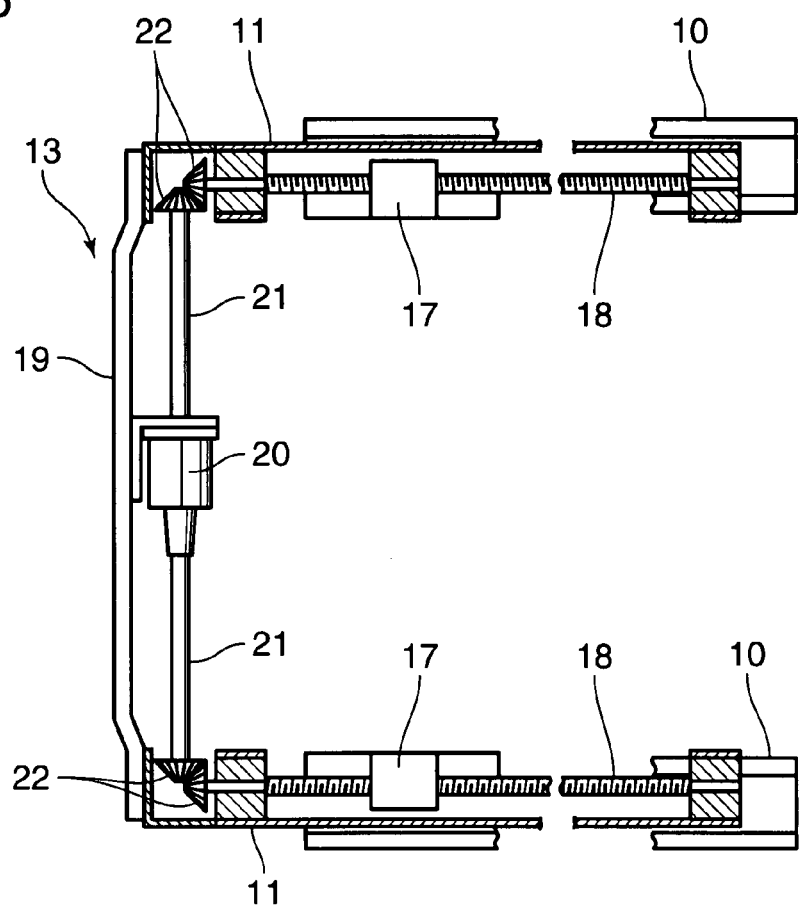
FIG. 5 is a sectional top plan view showing a specific structure of a seat drive mechanism in the vehicle seat assembly in FIG. 1.

As shown in FIG. 5, the seat drive mechanism 13 comprises a pair of right and left screw shafts 18 each having front and rear ends rotatably supported by respective bearing members attached to a corresponding one of the upper rails 11, a connection frame 19 connecting between the front ends of the right and left upper rails 11, a drive motor 20 held by the connection frame 19 through a bracket, and a drive shaft 21 disposed to extend in a lateral direction of the vehicle body and adapted to be rotationally driven by the drive motor 20. Each of right and left ends of the drive shaft 21 and the front ends of the right and left screw shafts 18 is provided with a bevel gear 22 adapted to transmit a rotational driving force of the drive shaft 21 to the screw shaft 18. Further, each of the screw shafts 18 is screwed with an internally threaded portion of a slide block 17 fixed to an upper end of a corresponding one of the lower rails 10. Thus, when the drive shaft 21 is rotationally driven according to a positive or negative rotation of the drive motor 20, the torque is transmitted to each of the screw shafts 18 through the bevel gears 22 to rotationally drive the screw shaft 18, and thereby the screw shaft 18 screwed with the internally threaded portion of the slide block 17 is moved frontwardly or rearwardly, so that the upper rail 11 and the seat-cushion frame 10 can be moved in the longitudinal direction along the lower rail 10.

Figure 6:
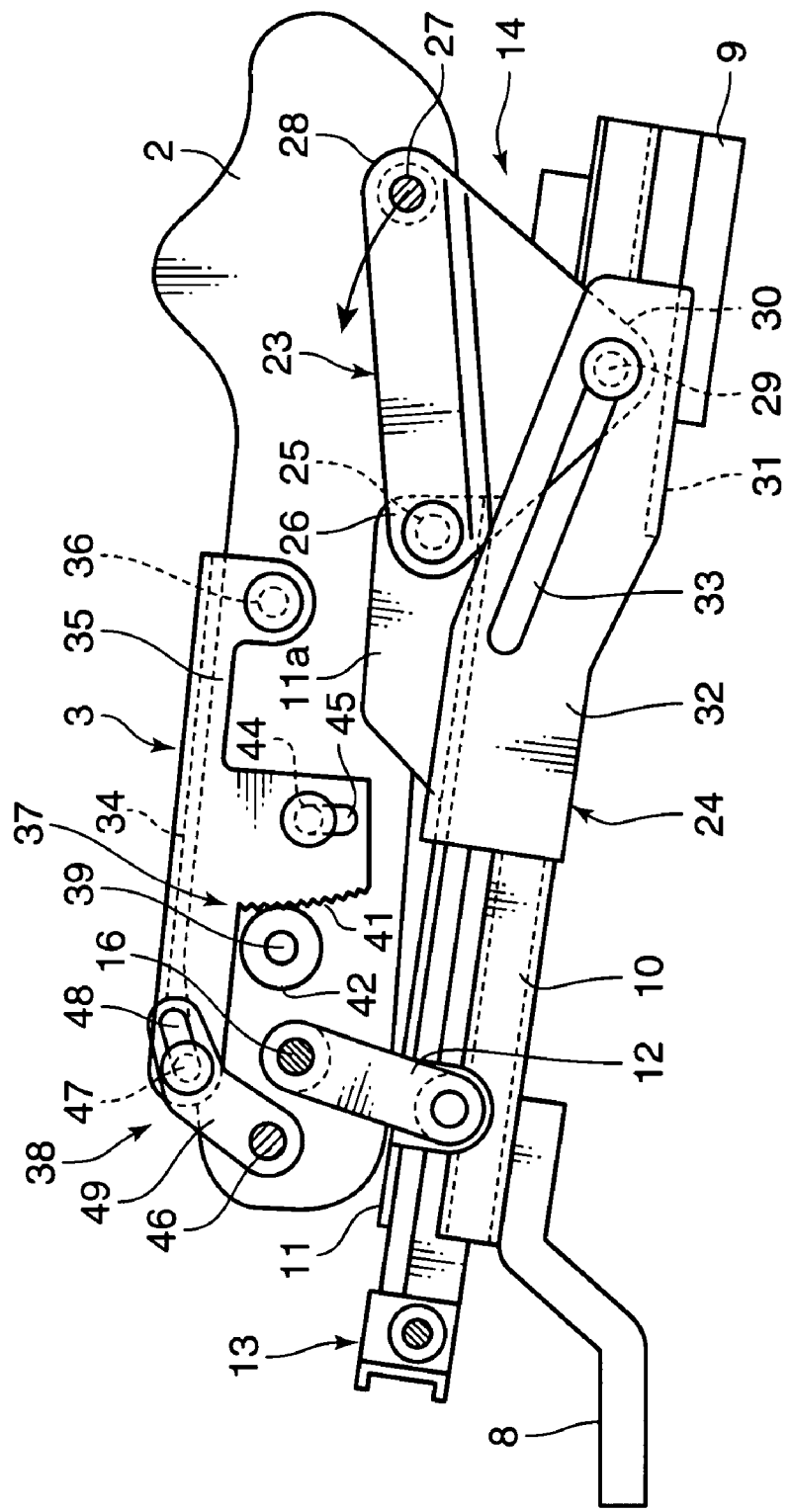
FIG. 6 is a fragmentary sectional side view showing the structure of the vehicle seat assembly in FIG. 1.

As shown in FIGS. 3 and 6, the lifting/lowering drive mechanism 14 for drivingly lifting/lowering the rear end of the seat-cushion frame 2 comprises a rear link member 23 provided in the rear end of the seat-cushion frame 2, and a vehicle body-side support member 24 disposed on a laterally inward side relative to a rear end lower rail 10. The rear link member 23 is composed of a plate member formed in an approximately triangular shape in side view, and three apex regions of the rear link member 23 are provided with a pivoted portion associated with the upper rail 11, a coupled portion associated with the seat-cushion frame 2, and an engaged portion associated with the vehicle body-side support member 24, respectively. Specifically, the pivoted portion 26 is provided in a front region of the rear link member 23 in side view (of the vehicle seat assembly), and pivotally supported by an inner surface of the rear end of the upper rail 11 through a pivot shaft 25. The coupled portion 28 is provided in a rear upper region of the rear link member 23 in side view, and coupled to a rod-shaped rear connection member 27 disposed to connect between respective rear regions of the right and left seat-cushion frames 2. The engaged portion 30 is provided in a lower region of the rear link member 23 in side view, and engaged with the vehicle body-side support member 24 through an engagement pin 29.

The vehicle body-side support member 24 has a fixed plate 31 fixed to the vehicle body, such as the floor portion of the occupant compartment, together with the rear support leg 9 supporting the rear end of the lower rail 10, and a standing plate 32 which extends upwardly from an laterally inward edge of the fixed plate 31 along a laterally inward sidewall of the seat slide rail 1, specifically extends upwardly at a position below the seat-cushion frame 2 and on the side of a laterally inward surface of the seat-cushion frame 2. This standing plate 32 is formed with a sliding groove 33 serving as a sliding drive portion having a frontwardly-upward inclination with a steeper inclination angle than that of the seat slide rail 1, and the engagement pin 29 is slidably engaged with the sliding groove 33. Thus, when the seat-cushion frame 2 is moved in the longitudinal direction, the rear link member 23 can be swingably displaced about the pivoted portion 26 to drivingly lift/lower the rear end of the seat-cushion frame 2.

As above, the pivoted portion 26 provided in the front region of the rear link member 23 is pivotally supported by the rear end of the upper rail 11, and the engaged portion 30 provided in the lower region of the rear link member 23 is engaged with the steeply-inclined sliding groove 33 through the engagement pin 29. Thus, as shown in FIGS. 2 and 6, when the upper rail 11 and the seat-cushion frame 2 are located at a rearmost position of the seat slide rail 1, and thereby the engagement pin 29 provided in the lower region of the rear link member 23 is located at a rearmost end of the sliding groove 33, the engaged portion 30 is supported by the vehicle body-side support member 24, in such a manner as to be located maximally apart from the seat slide rail 1 downwardly.

Figure 7:
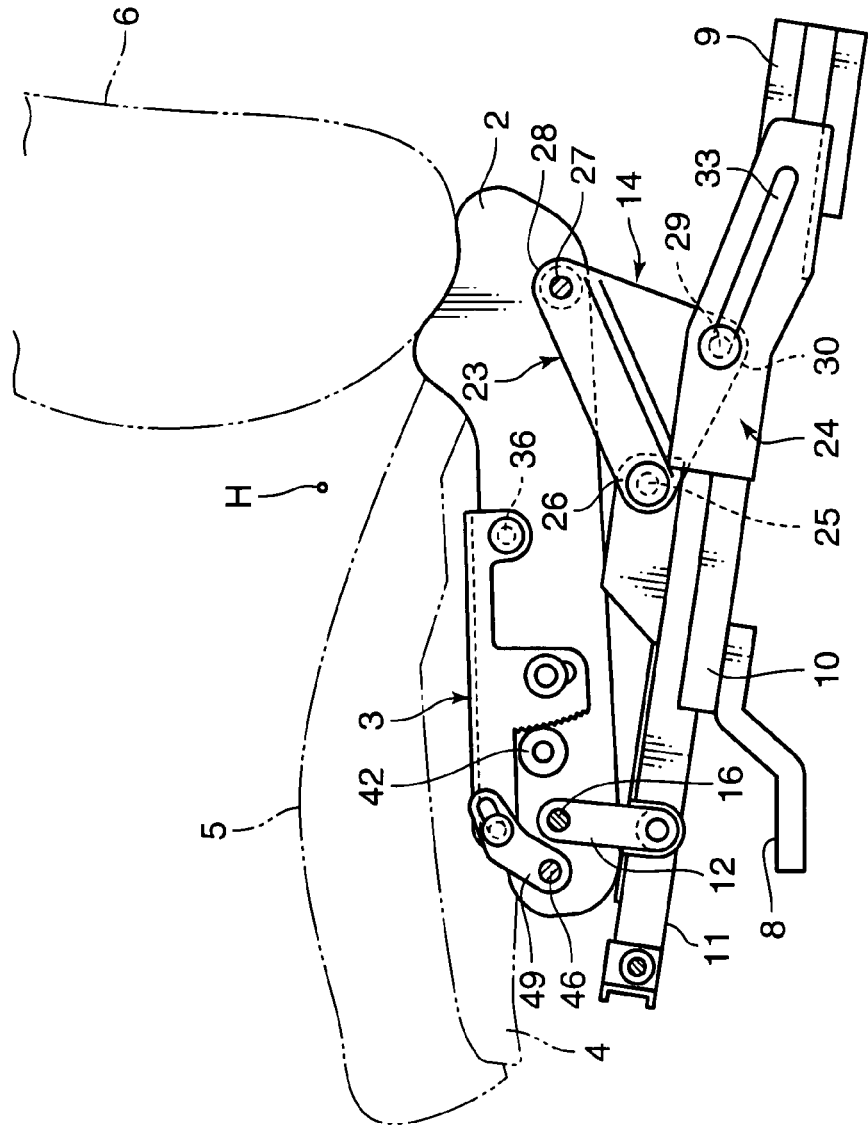
FIG. 7 is a sectional side view of the vehicle seat assembly in FIG. 1, in a state after a seat cushion is moved frontwardly.

Then, when the seat drive mechanism 13 is activated to slidingly displace the upper rail 11 and the seat-cushion frame 2 from the rearmost position toward a frontward direction of the vehicle body, the pivoted portion 26 of the rear link member 23 is moved frontwardly and parallel to the seat slide rail 1. Concurrently, the engagement pin 29 provided in the lower region of the rear link member 23 is slidingly displaced along the sliding groove 33. Thus, the engaged portion 30 located apart from the upper rail 11 of the seat slide rail 1 downwardly is displaced in a direction coming closer to the upper rail 11, and thereby the rear link member 23 is swingingly displaced about the pivoted portion 26 as indicated by the arrow in FIG. 6, so that the coupled portion 28 provided in the rear upper region of the rear link member 23 and associated with the seat-cushion frame 2 is displaced upwardly as shown in FIG. 7, and the rear end of the seat-cushion frame 2 is pushed upwardly together with the rear connection member 27. That is, a positional relationship of the pivoted portion 26, the coupled portion 28 and the engaged portion 30 is set such that, when the seat-cushion frame 2 is slidingly displaced in the frontward direction of the vehicle body and thereby the rear link member 23 is moved to a lift position for drivingly lifting the seat-cushion frame 2, the coupled portion 28 associated with the seat-cushion frame 2 is displaced to be located in an uppermost apex region of the rear link member 23 formed in an approximately triangular shape in side view.

Figure 8:
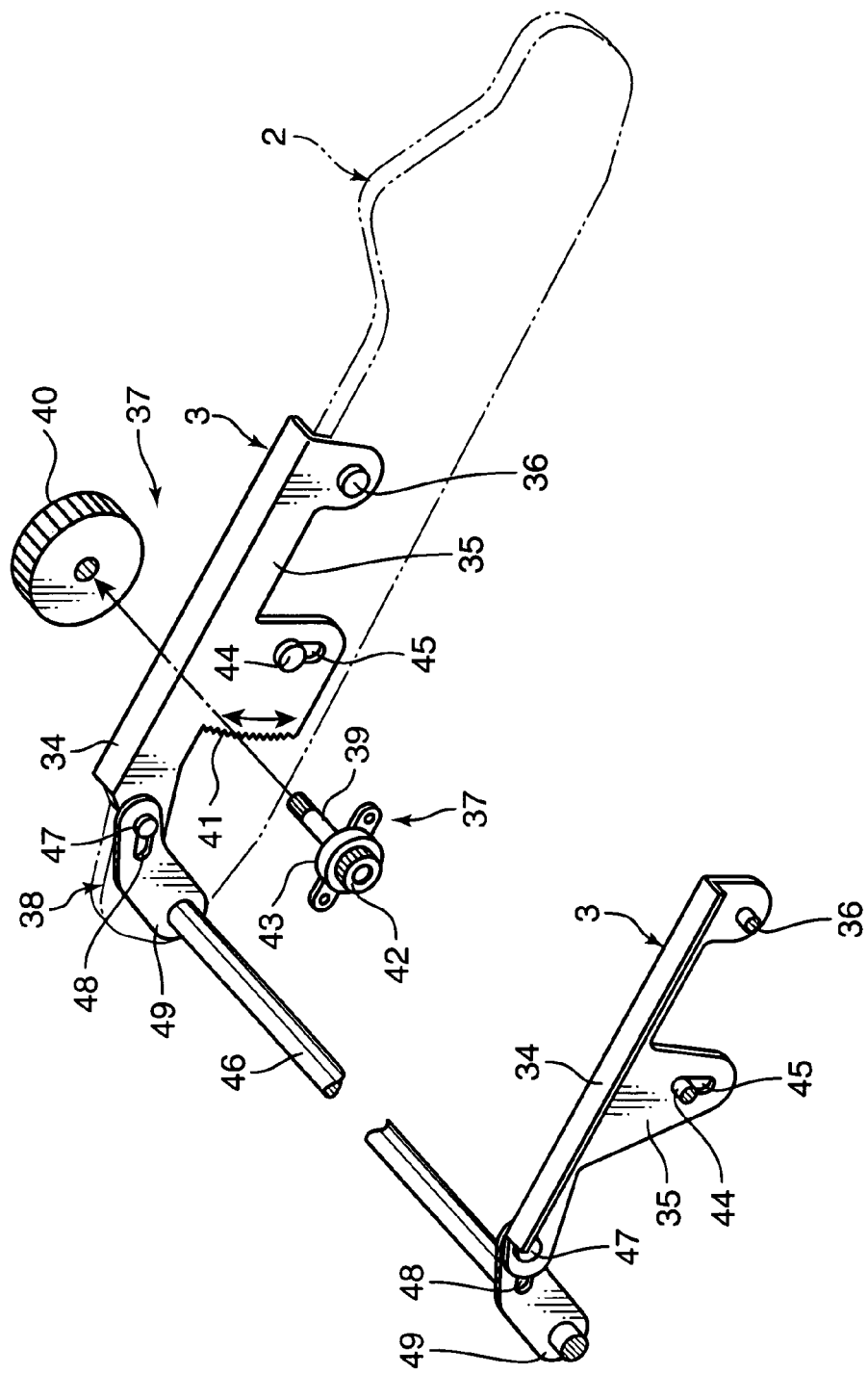
FIG. 8 is a perspective view showing a specific structure of an angle adjustment mechanism in the vehicle seat assembly in FIG. 1.

As shown in FIGS. 6 and 8, each of the seat-cushion support members 3 has a horizontal plate 34 fixed to a lower surface of a corresponding one of right and left sidewalls of the seat-cushion pan 4 by fastening means, such as bolting, and a vertical plate 35 extending downward from a laterally inward edge of the horizontal plate 34 along the laterally inward surface of the seat-cushion frame 2. A rear end of the vertical plate 35 is pivotally supported by a pivot shaft 36 protrudingly provided on an inner wall surface of the seat-cushion frame 2, so as to allow the seat-cushion support member 3 to be swingably moved about the pivot shaft 36 (serving as a pivot member). The right and left seat-cushion support members 3 are designed such that a first one of seat-cushion support members 3 (right seat-cushion support member) is driven by an angle adjustment mechanism 37 associated with one of the seat-cushion frames 2 (right seat-cushion frame), in such a manner as to be swingingly displaced about the pivot shaft 36, and this swing motion is transmitted to a second one of the seat-cushion support members 3 (left seat-cushion support member) through a motion-transmitting mechanism 38.

The angle adjustment mechanism 37 includes a rotary shaft 39 rotatably supported by the seat-cushion frame 2, a manual operation handle 40 adapted to allow an occupant to manually rotate the rotary shaft 39, and a drive gear 42 fixed to a distal end of the rotary shaft 39. The drive gear 42 is disposed to mesh with a sector gear 41 formed in a longitudinally intermediate portion of the right seat-cushion support member 3. The rotary shaft 39 is provided with an anti-reverse-rotation mechanism, such as a conventional drum brake, which is adapted to allow a rotational motion of the manual operation handle 40 to be transmitted to the drive gear 42 through the rotary shaft 39, and prevent a rotational motion which is input from the sector gear 41 into the drive gear 42 due to a weight of the seat cushion 5 and others, from being transmitted toward a base end of the rotary shaft 39 (toward the manual operation handle 40) so as to restrict a swinging displacement (swing motion) of the right seat-cushion support member 3. The right seat-cushion support member 3 has a support groove 45 formed in the intermediate portion on a rear side of the sector gear 41 to allow a guide pin 44 protrudingly provided on the right seat-cushion frame 2 to be slidably engaged therewith. Thus, when the right seat-cushion support member 3 is swingingly displaced, the guide pin 44 is slidably displaced along the support groove 45 to prevent wobbling of the right seat-cushion support member 3.

The motion-transmitting mechanism 38 comprises a pair of right and left front link members 49 each having a base end which is pivotally supported by a corresponding one of the right and left seat-cushion frames 2 through a support bar 46 connecting between the respective front ends of the seat-cushion frames 2, and a distal end formed with an elongate hole 48. Correspondingly, each of the seat-cushion support members 3 is provided with a coupling pin 47 protruding therefrom. The coupling pin 47 is slidably engaged with the elongate hole 48 to allow the distal end of the front link member 49 to be coupled to the seat-cushion support member 3. Thus, a motion input into the right seat-cushion support member 3 and the right front link member 49 from the angle adjustment mechanism 37 is transmitted to the left front link member 49 and the left seat-cushion support member 3 through the support bar 46 serving as an interlock member to allow the left seat-cushion support member 3 to be swingingly displaced simultaneously with the right seat-cushion support member 3.

Specifically, when an occupant manually rotates the manual operation handle 40, the rotational motion is transmitted to the drive gear 42 through the rotary shaft 39, and thereby the drive gear 42 is rotationally driven to move the sector gear 41. Thus, the right seat-cushion support member 3 is swingingly displaced about the pivot shaft 36 at the rear end thereof. According to the swing motion of the right seat-cushion support member 3, the right front link member 49 coupled to the front end of the right seat-cushion support member 3 is swingingly displaced about the support bar 46 at the base (i.e., lower) end thereof, and the swing motion of the right front link member 49 is transmitted to the left front link member 49 through the support bar 46 to swingingly displace the left front link member 49. Thus, the front end of the left seat-cushion support member 3 is driven through the left front link member 49 in such a manner as to be swingingly displaced from a lowered position illustrated in FIGS. 6 and 7 to a lifted position illustrated in FIG. 9, about the pivot shaft 36 at the rear end of the left seat-cushion support member 3.

For example, when a short occupant sits on the occupant seat of the above vehicle seat assembly, and operates a control switch (not shown) to rotate the drive motor 20 of the seat drive mechanism 13 in the positive direction, the upper rail 11 in each of the seat slide rails 1 is moved in the frontward direction of the vehicle body, and thereby the seat-cushion frame 2 is moved frontwardly and upwardly along the lower rail 10 of the seat slide rail 1 mounted with the frontwardly-upward inclination. Further, as shown in FIG. 7, the rear end of the seat-cushion frame 2 is pushed upwardly by the lifting/lowering drive mechanism 14 which has the rear link member 23 pivotally supported by the rear end of the seat-cushion frame 2, and the vehicle body-side support member 24. Then, when the rear end of the seat-cushion frame 2 is pushed upwardly in conjunction with the frontward movement of the seat-cushion frame 2 and the seat cushion 5, the seat cushion 5 is swingingly displaced about the front connection member 16 provided at the upper end of the coupling link member 12, so that an angular position of the seat cushion 5 is changed to an approximately horizontal position.

When another occupant, for example, who have a body height fairly greater than the average (hereinafter referred to as "tall occupant"), sits on the seat cushion 5, and operates the control switch to rotate the drive motor 20 of the seat drive mechanism 13 in the negative direction, the upper rail 11 in each of the seat slide rails 1 is moved in the rearward direction of the vehicle body, and thereby the seat-cushion frame 2 is moved rearwardly and downwardly along the lower rail 10. Further, as shown in FIG. 2, the rear end of the seat-cushion frame 2 is pulled downwardly by the lifting/lowering drive mechanism 14 comprising the rear link member 23 and the vehicle body-side support member 24. Then, when the rear end of the seat-cushion frame 2 is pulled upwardly in conjunction with the rearward movement of the seat-cushion frame 2 and the seat cushion 5, the seat cushion 5 is swingingly displaced to have a frontwardly-upward inclination.

After the seat-cushion frame 2 and the seat cushion 5 are slidingly displaced to adjust a longitudinal position of the seat cushion 5, an occupant may manually rotate the manual operation handle 40 of the angle adjustment mechanism 37 according to need, to drivingly move the right seat-cushion support member 3. In this case, the motion of the right seat-cushion support member 3 is transmitted to the left seat-cushion support member 3 through the motion-transmitting mechanism 38 to swingingly displace the right and left seat-cushion support members 3 about the respective pivot shafts 36 at the rear ends thereof, in a simultaneous manner. In this way, an angular position (inclination angle) of the seat cushion 5 supported through the seat-cushion support members 3 and seat-cushion pan 4 can be arbitrarily adjusted.

As described above, the vehicle seat assembly according to the first embodiment includes: the pair of right and left seat slide rails 1 comprising the pair of right and left lower rails 10 each fixed onto the floor portion of the occupant compartment to extend in the longitudinal direction of the vehicle body, and the pair of right and left upper rails 11 slidably supported along corresponding ones of the lower rails 10; and the pair of right and left seat-cushion frames 2 each supported by a corresponding one of the seat slide rails 1 in such a manner as to be moved in the longitudinal direction together with a corresponding one of the upper rails 11. The vehicle seat assembly is provided with: the coupling link member 12 serving as a coupling member coupling the front end of each of the seat-cushion frames 2 to a corresponding one of the upper rails 11; the rear link member 23 provided in the rear end of each of the seat-cushion frames 2; and the vehicle body-side support member 24 provided on the side of the vehicle body to support the rear link member 23. The rear link member 23 includes the pivoted portion 26 pivotally supported by the upper rail 11, the coupled portion 28 coupled to the rear end of the seat-cushion frame 2, and the engaged portion 30 engaged with the vehicle body-side support member 24. The vehicle body-side support member 24 includes the sliding groove 33 serving as a sliding drive portion which slidably supports the engaged portion 30 of the rear link member 23 to allow the rear link member 23 to be swingingly displaced about the pivoted portion 26 in conjunction with a longitudinal movement of the seat-cushion frame 2, so as to move the coupled portion 28 of the rear link member 23 in an upward/downward direction to drivingly lift and lower the rear end of the seat-cushion frame 2. This vehicle seat assembly has an advantage of being able to effectively adjust a height position of the seat cushion 5 so as to ensure an adequate field of vision of an occupant, in conjunction with an operation of adjusting a longitudinal (frontward/rearward) position of the seat cushion 5 of the occupant seat in conformity to the physique or the like of the occupant.

Specifically, when a short occupant sits on the seat cushion 5, the upper rails 11 and the seat-cushion frames 2 are slidingly displaced in the frontward direction of the vehicle body to move the seat cushion 5 frontwardly and upwardly along the lower rail 10 in each of the seat slide rails 1, and the engagement pin 29 provided in the engaged portion 30 of the rear link member 30 is slidingly displaced along the sliding groove 33 (serving as a sliding drive portion) of the vehicle body-side support member 24, to lift the rear end of the rear link member 30 at a steep angle so as to allow the rear end of the seat cushion 5 coupled to the rear link member 30 to be largely pushed upwardly, as shown in FIG. 7. Thus, the hip point H, i.e., a position of a hip joint of an occupant, located in a rear region of the seat cushion 5, can be effectively moved frontwardly and upwardly in conformity to a body height or seated height of the occupant.

The rear link member 23 is designed to be swingingly displaced about the pivoted portion 26 according to the sliding displacement of the engaged portion 30 of the rear link member 23 along the sliding groove 33, so as to change a push-up amount (i.e., lift amount) of the rear end of the seat cushion 5. Thus, a movement locus of the hip point H can be variously changed according to not only the inclination angle of the sliding groove 33 but also other parameters. For example, as described in the vehicle seat assembly according to the first embodiment, the pivoted portion 28 associated with the upper rail 11, the coupled portion 28 associated with the seat-cushion frame 2 and the engaged portion 30 associated with the vehicle body-side support member 24 may be provided, respectively, in the front region, the rear upper region and the lower region of the rear link member 23. In this case, the rear link member 23 can be swingingly displaced in a direction for pushing the rear end of the seat cushion 5 upwardly, in conjunction with the frontward movement of the seat cushion 5. This makes it possible to more effectively move the hip point H corresponding to a position of a hip joint of an occupant, upwardly according to the swinging displacement of the rear link member 23.

Thus, the hip point for an occupant sitting on the seat cushion 5 can be significantly changed in conjunction with the longitudinal movement of the seat cushion 5, without taking disadvantageous measures, for example, extremely increasing a lever ratio of the rear link member 23, and without the occurrence of wobbling in the seat cushion 5. Therefore, a visual line of a short occupant highly likely to be located below an optimum line can be effectively moved upwardly to conform to the optimum line. Further, an inclination angle of the seat back 6 may be changed in conjunction with the change of the inclination angle of the seat cushion 5, to displace a head of the occupant frontwardly so as to allow an eye point of the occupant to effectively conform to the optimum line having a frontwardly-downward inclination.

In addition, the lifting/lowering drive mechanism 14 is operable to push the rear end of the seat-cushion frame 2 upwardly in conjunction with the frontward movement of the seat-cushion frame 2 and the seat cushion 5, so as to swingingly displace the seat-cushion frame 2 about the front connection member 16 provided at the upper end of the coupling link member 12, to set an angular position of the seat cushion 5 to an approximately horizontal position. Thus, while a length of legs in short occupants tends to become shorter in proportion to a decrease in body height, the short occupant can advantageously have a seating posture where his/her knees are largely bent and below-knee regions are stretched downwardly at a certain angle, so as to prevent his/her feet from being spaced apart from a floor.

When a tall occupant sits on the seat cushion 5, the upper rails 11 and the seat-cushion frames 2 are slidingly displaced rearwardly using the seat drive mechanism 13, the seat cushion 5 is moved downwardly along the lower rail 10 in each of the seat slide rails 1, and the engagement pin 29 is slidingly displaced along the slide groove 33 of the vehicle body-side support member 24 to lower the rear end of the rear link member 23 at a steep angle so as to largely pull the rear end of the seat cushion 5 downwardly, as shown in FIG. 2.

Specifically, the rear link member 23 is swingingly displaced about the pivoted portion 26 thereof as the engaged portion 30 of the rear link member 23 is slidingly displaced rearwardly and downwardly along the guide groove 33, to pull the rear end of the seat cushion 5 downwardly. Thus, the hip point H, i.e., a position of a hip joint of an occupant, located in the rear region of the seat cushion 5, can be effectively moved rearwardly and downwardly in conformity to a body height or seated height of the occupant. Further, the inclination angle of the seat back 6 may be changed in conjunction with the change of the inclination angle of the seat cushion 5, to displace a head of the occupant rearwardly so as to allow an eye point of the occupant to effectively conform to the optimum line having the rearwardly-upward inclination.

Thus, a visual line of a tall occupant highly likely to be located above the optimum line can be effectively moved downwardly to conform to the optimum line. Further, in conjunction with the rearward movement of the seat-cushion frame 2 and the seat cushion 5, the rear end of the seat cushion 5 is pulled downwardly to have a frontwardly-upward inclination. Thus, a tall occupant having longer legs in proportion to an increase in body height can advantageously have a seating posture where a bending angle of his/her knees is reduced to stretch below-knee regions frontwardly, so as to avoid a cramped posture.

In the vehicle seat assembly according to the first embodiment, the rear link member 23 disposed below the rear end of the seat cushion 5 is designed to be swingingly displaced in conjunction with the longitudinal movement of the seat-cushion frame 2, so as to drivingly lift/lower the rear end of the seat-cushion frame 2. This provides an advantage of being able to lay out the angle adjustment mechanism 37 for swingingly displacing the seat-cushion support member 3 to adjust an angular position of the seat cushion 5, in a front region of the seat-cushion frame 2. Thus, the angular position of the seat cushion 5 can be arbitrarily adjusted in conformity to occupant's physique or according to occupant's preference, using the angle adjustment mechanism 37.

In the vehicle seat assembly according to the first embodiment, the rear link member 23 is formed in an approximately triangular shape in side view, and the pivoted portion 26, the coupled portion 28 and the engaged portion 30 are provided in three apex regions of the rear link member 23, respectively. This provides an advantage of being able to drivingly lift/lower the rear end of the seat-cushion frame 2 effectively in a compact configuration while preventing the regions of the rear link member 23 from interfering with a peripheral member of the vehicle seat assembly. In addition, even if the rear link member 23 is disposed below the rear end of the seat cushion 5, interference between a lower edge of the rear link member 23 and a floor surface can be avoided without taking costly measures, for example, lowering a position of a floor panel. Further, a distance between respective ones of the pivoted portion 26, the coupled portion 28 and the engaged portion 30 may be appropriately changed to variously change respective movement loci of the rear end of the seat cushion 5 and the hip point H.

Particularly, in the vehicle seat assembly according to the first embodiment, the positional relationship of the pivoted portion 26, the coupled portion 28 and the engaged portion 30 provided in the rear link member 23 is set such that, when the rear link member 23 is moved to a lift position for drivingly lifting the seat-cushion frame 2, the coupled portion 28 associated with the seat-cushion frame 2 is displaced to be located in an uppermost apex region of the rear link member 23 formed in an approximately triangular shape in side view. That is, when the seat-cushion frame 2 is moved frontwardly, the rear link member 23 is displaced to have an upwardly-narrowing triangular shape in side view. This makes it possible to effectively prevent the coupling portion 28 of the rear link member 23 from interfering with the seat-cushion pan 4, the seat-cushion frame 2 or the like, during the frontward movement of the seat-cushion frame 2. Further, when the rear link member 23 is located at the lift position for drivingly lifting the seat-cushion frame 2, the pivoted portion 26 is located on a front side of a lower region of the rear link member 23, and the engaged portion 30 is located on a rear side of the lower region. This provides an advantage of being able to stably hold the rear link member 23 at the lift position.

In the first embodiment, the sliding groove 33 is formed in the vehicle body-side support member 24, and the engagement pin 29 provided in the engaged portion 30 of the rear link member 23 is slidably engaged with the sliding groove 33. Alternatively, the sliding drive portion may be a concave portion which is formed in the vehicle body-side support member 24 to allow a distal end of an engagement member, such as an engagement pin, protrudingly provided in the engaged portion of the rear link member 23, to be slidably fitted thereinto. In this case, the engagement member, such as an engagement pin, is slidingly displaced along the concave portion in conjunction with the longitudinal movement of the seat-cushion frame 2, to swingingly displace the rear link member about the pivoted portion 26.

Figure 10:
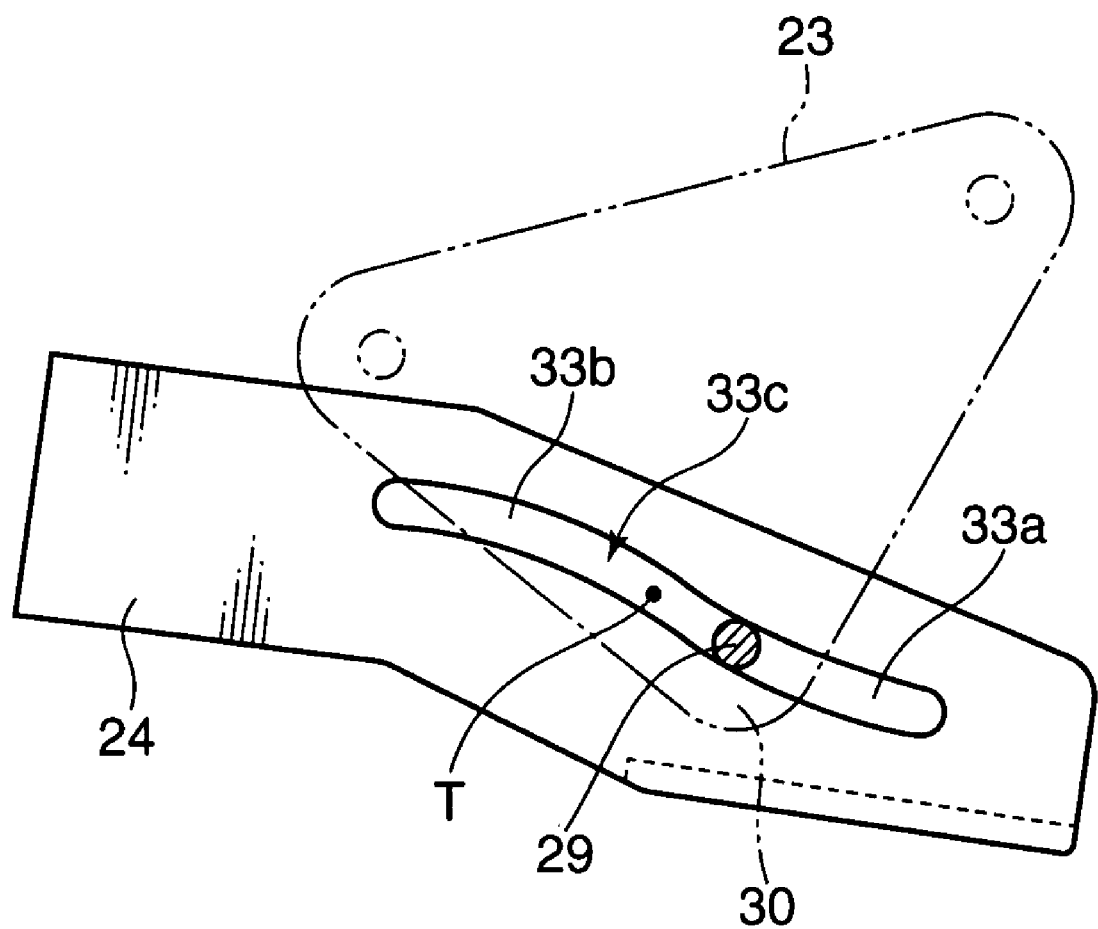
FIG. 10 is a side view showing one example of modification of the vehicle seat assembly according to the first embodiment.

In the first embodiment, the sliding groove 33 is formed in the vehicle body-side support member 24 to extend linearly in a direction from a rear end to a front end of the vehicle seat assembly with a frontwardly-upward inclination. Alternatively, as shown in FIG. 10, the vehicle body-side support member 24 may be formed with a gentle S-shaped sliding groove 33c including, in side view, a rear inclined portion 33a having an upward inclination which gently increases in a direction from a rear end to a front end of the vehicle seat assembly, and a front inclined portion 33b extending frontwardly from the rear inclined portion 33a and having an upward inclination which gently decreases in the direction. Further, the engaged portion 30 of the rear link member 23 may be slidably engaged with the sliding groove 33c through the engagement pin 29.

Figure 11:
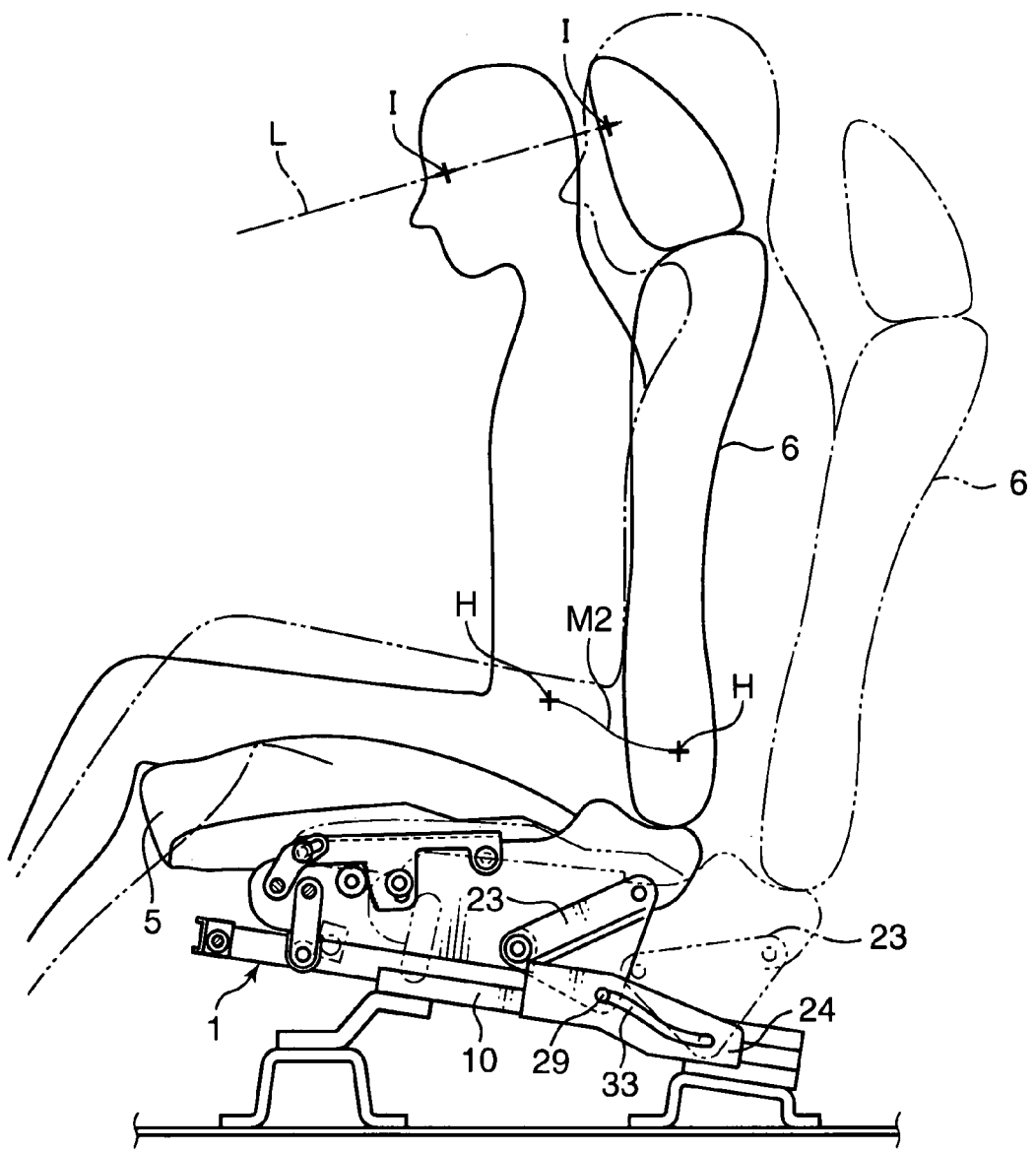
FIG. 11 is an explanatory diagram showing an operation of the modification in FIG. 10.

In the above structure, the engaged portion 30 of the rear link member 23 can be slidingly displaced along the gentle S-shaped sliding groove 33c in conjunction with the longitudinal movement of the seat cushion 5, to drivingly lift/lower the rear end of the seat cushion 5 so as to displace the hip point H for an occupant sitting on the seat cushion 5, along a gentle S-shaped locus M2, as shown in FIG. 11. This provides an advantage of being able to adequately change a seating posture and a position of a visual point of the occupant in conformity to the physique of the occupant, without increasing a longitudinal movement distance of the seat cushion 5. Specifically, in occupants having an average level of body heights, a change in body height tends to cause a significant difference in seated height. In this case, the hip point H can be displaced along the gentle S-shaped locus M2 in conjunction with the longitudinal movement of the seat cushion 5, as mentioned above, to advantageously change a visual point I of the occupant so as to conform to an optimum line L, and allow legs of the occupant to be set at an adequate bending angle so as to maintain a desirable seating posture. When the sliding groove 33c is formed in the gentle S shape, a boundary portion T between the rear inclined portion 33a and the front inclined portion 33b has a maximum inclination angle, and a driving load of the engagement pin 29 is increased when the engagement pin 29 passes through the boundary portion T in conjunction with the forward movement of the seat cushion 5. Thus, it is necessary to set a driving force of the seat driving mechanism 13 at a value enough to cope with the increased driving load.

Figure 12:
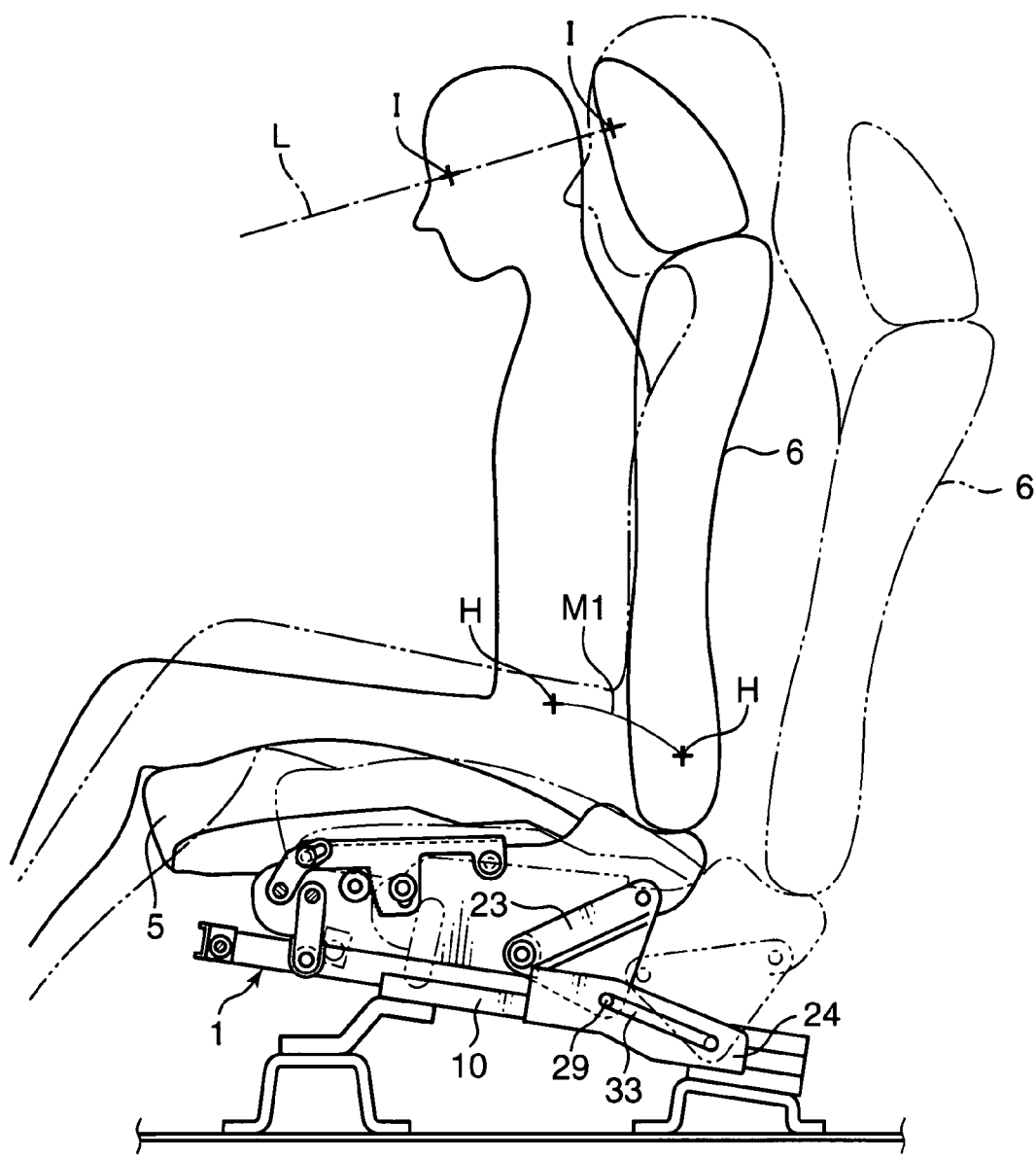
FIG. 12 is an explanatory diagram showing an operation of the vehicle seat assembly according to the first embodiment.
Figure 13:
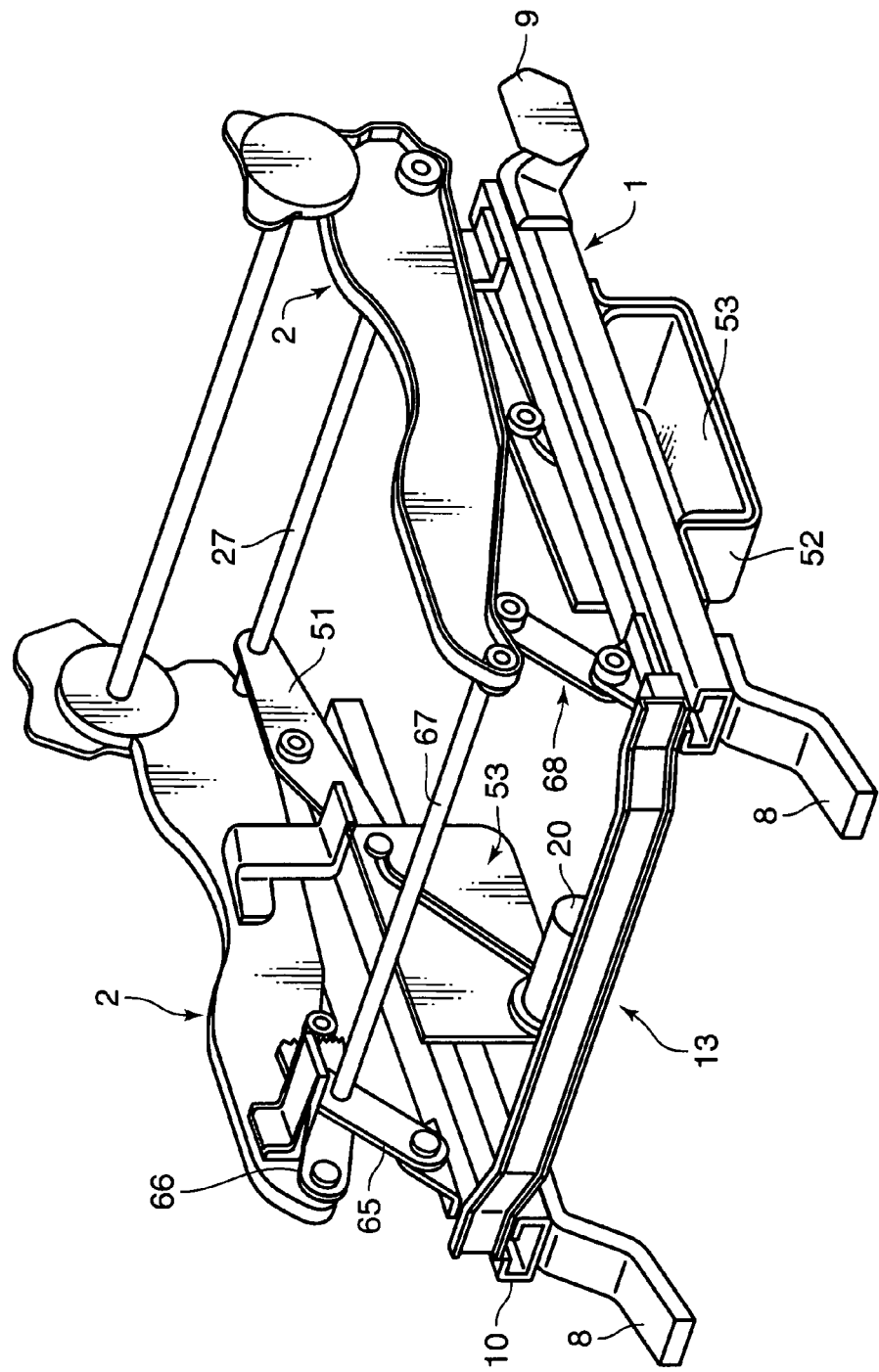
FIG. 13 is a perspective view showing a vehicle seat assembly according to a second embodiment of the present invention.
Figure 14:
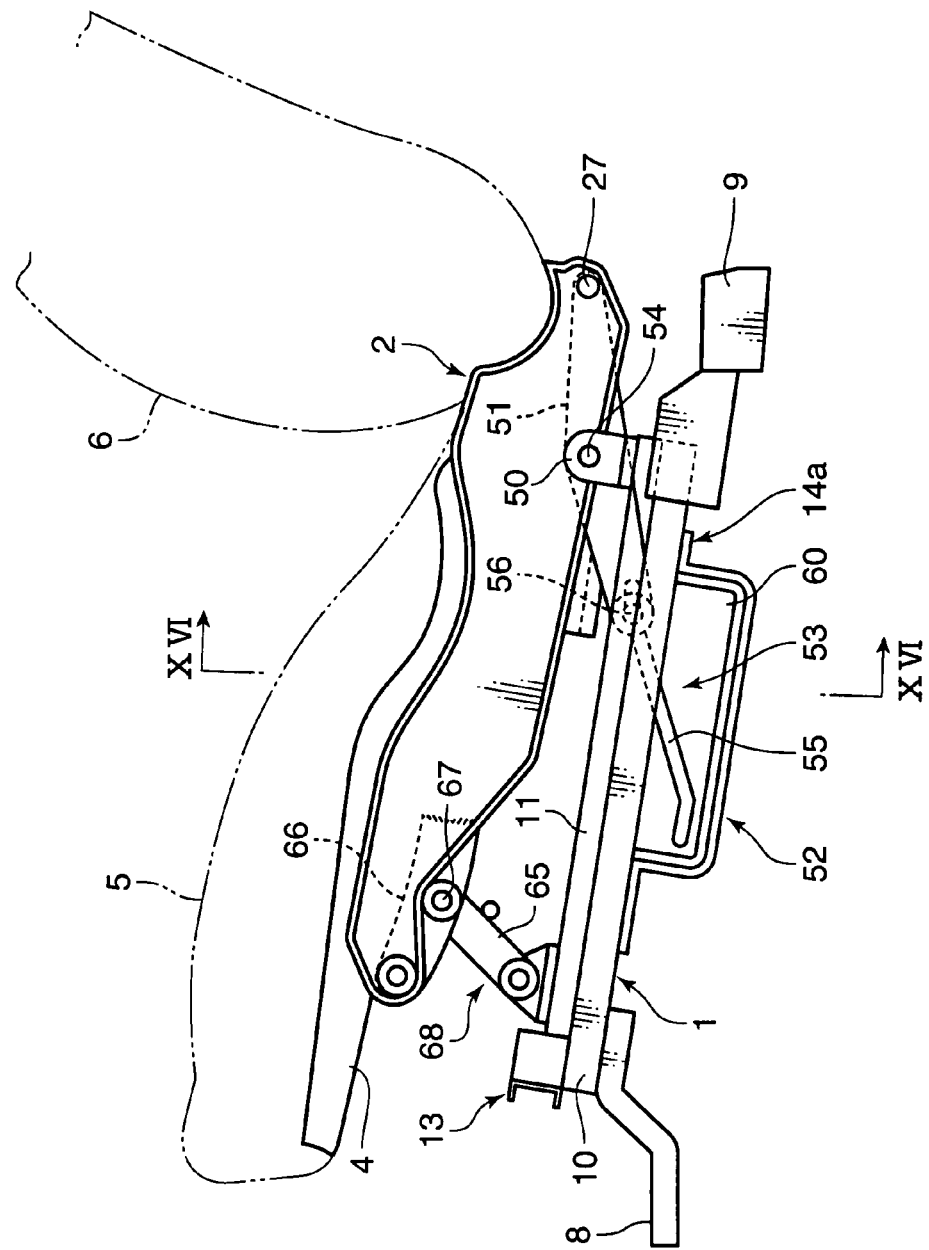
FIG. 14 is a side view of the vehicle seat assembly in FIG. 13.
Figure 15:
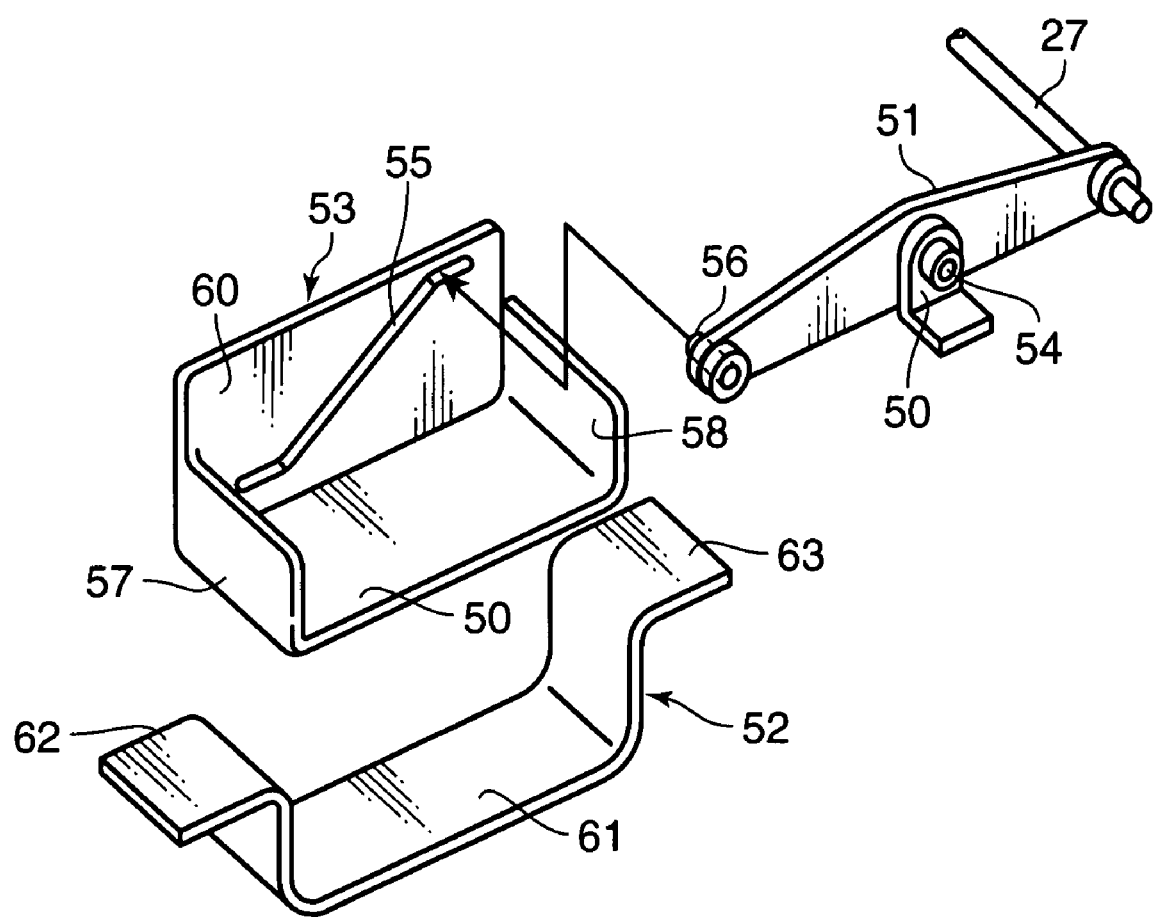
FIG. 15 is a perspective view showing a specific structure of a lifting/lowering drive mechanism in the vehicle seat assembly in FIG. 13.

By contrast, as shown in FIG. 12, in the structure where the vehicle body-side support member 24 is formed with the sliding groove 33 having, in side view, an inclination which linearly increases in a direction from a rear end to a front end of the vehicle seat assembly, and the engaged portion 30 of the rear link member 23 is slidably engaged with the sliding groove 33 through the engagement pin 29, there is no large change in load for slidingly displacing the engaged portion 30 of the rear link member 23 along the sliding groove 33 in conjunction with the forward movement of the seat cushion 5. This provides an advantage of being able to swingingly displace the rear link member 23 in a smooth manner so as to facilitate drivingly lifting/lowering the rear end of the seat cushion 5, without the need for a large driving force. In addition, the hip point H can be displaced along an upwardly-convexed locus M1 to change a visual point I of an occupant to conform to the optimum line L.

The vehicle seat assembly according to the first embodiment includes the rear connection member 27 connecting between the pair of right and left seat-cushion frames 2, and the coupled portion 28 of the rear link member 23 is coupled to the rear connection member 27. Thus, the right and left seat-cushion frames 2 can be coupled together in a simple configuration without using additional means for coupling the coupled portion 28 of the rear link member 23 to the seat-cushion frame 2, such as a coupling pin. In addition, the rear connection member 27 makes it possible to ensure sufficient stiffness in the rear end of the seat-cushion frame 2, so as to drivingly lift/lower the rear end of the seat-cushion frame 2 in a smooth manner.

The vehicle seat assembly according to the first embodiment includes the seat-cushion support member 3 disposed in an upper region of each of the seat-cushion frames 2 to support the seat cushion 5, the pivot shaft 36 serving as a pivot member pivotally mounting the seat-cushion support member 3 to the seat-cushion frame 2, and the angle adjustment mechanism 37 adapted to swingingly displace the seat-cushion support member 3 about the pivot member so as to adjust an angular position of the seat cushion 5. This provides an advantage of being able to adequately adjust a seating posture of an occupant according to occupant's preference, regardless of a longitudinal position of the seat cushion 5.

Figure 9:
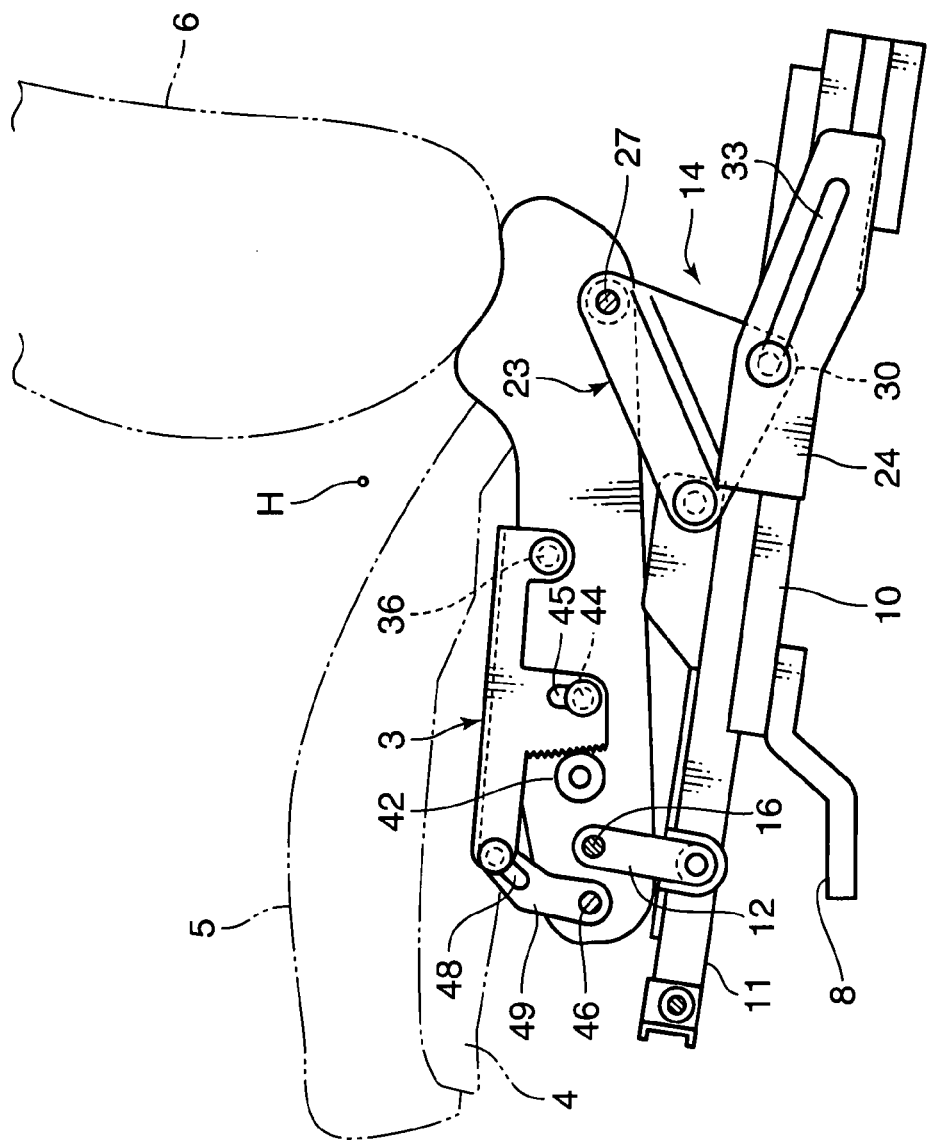
FIG. 9 is a sectional side view of the vehicle seat assembly in FIG. 1, in a state after a front end of the seat cushion is lifted.

For example, as shown in FIG. 7, when the seat cushion 5 is moved in the frontward direction of the vehicle body to allow a visual line of an occupant having a relatively low seated height to conform to the optimum line, the rear end of the seat cushion 5 is pushed upwardly by the lifting/lowering drive mechanism 14 having the rear link member 23. Although this angular position of the seat cushion 5 is advantageous to an occupant having relatively short legs because it can provide a seating posture where his/her knees are largely bent and below-knee regions are stretched downwardly at a certain angle, so as to prevent his/her feet from being spaced apart from a floor, it is likely to cause instability in seating posture of an occupant having relatively long legs. Thus, an occupant having a relatively low seated height and relatively long legs can move the seat cushion 5 in the frontward direction of the vehicle body in the above manner, and then drivingly move the front end of the seat-cushion support member 3 using the angle adjustment mechanism 37 to provide a frontwardly-upward inclination to the seat cushion 5, as shown in FIG. 9, so that the occupant can stretch his/her legs to advantageously obtain a stable seating posture.

For example, when an export vehicle to Europe, the United States, etc., which is highly likely to be used by an occupant having relatively long legs, and a domestic vehicle which is highly likely to be used by an occupant having relatively short legs, are provided with the angle adjustment mechanism 37 adapted to adjust an angular position of the seat cushion 5, the front end of the seat cushion 5 may be displaced upwardly or downwardly using the angle adjustment mechanism 37 to preset a different initial inclination angle of the seat cushion 5 between the two vehicles. In this case, a seating posture of an occupant can be advantageously adjusted readily and adequately in both situations where a fairly tall occupant is likely to sit on the seat cushion 5 and where a fairly short occupant is likely to sit on the seat cushion 5, while preventing an increase in longitudinal movement distance of the seat cushion 5.

In the vehicle seat assembly according to the first embodiment, the pivot member (pivot shaft 36) associated with the seat-cushion frame 2 is provided in the rear end of the seat-cushion support member 3, and the angle adjustment mechanism 37 is disposed frontwardly relative to the pivot member. Thus, even if a large load is applied to the seat cushion 5 of the occupant seat in a rearward direction of the vehicle body due to a vehicle collision or the like when an occupant sits on the seat cushion 5, the pivot member can prevent the load from being input to the mounting region of the angle adjustment mechanism 37. This makes it possible to effectively prevent the occurrence of an undesirable situation where the seat-cushion support member 3 is adversely affected by a load, such as an impact load, input from the seat back 6 through the seat-cushion frame 2, to cause instability in support of the seat cushion 5 based on the seat-cushion support member 3.

In the vehicle seat assembly according to the first embodiment, the vehicle body-side support member 24 formed with the sliding groove 33 serving as a sliding drive portion is disposed on a laterally inward side relative to each of the seat slide rails 1. This provides advantages of being able to prevent deterioration in appearance due to exposure of the vehicle body-side support member 24 to the occupant compartment, and lay out the slide rails 1 and the vehicle body-side support members 24 in a dead space defined below the seat cushion 5 so as to effectively utilize the dead space.

Second Embodiment

The vehicle seat assembly according to the first embodiment employs the lifting/lowering drive mechanism 14 which comprises the rear link member 23 formed in an approximately triangular shape in side view, and the vehicle body-side support member 24 slidably supporting the engaged portion 30 provided in the rear lower region of the rear link member 23. Further, as the angular-position adjusting mechanism for the seat cushion 5, the vehicle seat assembly according to the first embodiment employs the seat-cushion support members 3, the angle adjustment mechanism 37 and the motion-transmitting mechanism 38. FIGS. 13 to 17 show a vehicle seat assembly according to a second embodiment of the present invention. The vehicle seat assembly according to the second embodiment is different from the vehicle seat assembly according to the first embodiment, in that the vehicle seat assembly according to the second embodiment employs a lifting/lowering drive mechanism 14a in place of the lifting/lowering drive mechanism 14, and an angular-position adjusting mechanism different from that in the first embodiment. Except for these differences, the vehicle seat assembly according to the first embodiment has substantially the same structure as that in the first embodiment. Thus, in FIGS. 13 to 17, the same element or component as that in the first embodiment is defined by the same reference numeral or code, and its detailed description will be omitted. The lifting/lowering drive mechanism 14a includes a rear link member 51 formed as an arm-shaped member swingably supported by a support bracket 50 provided in each of right and left upper rails 11, and a vehicle body-side support member 53 fixed to each of right and left lower rails through a mounting bracket 52 and formed to support a front end of the rear link member 51. The rear link member 51 comprises a plate member formed in an arm shape in side view, which has a central region pivotally supported by the support bracket 50, and a rear end coupled to a corresponding one of a pair of right and left seat-cushion frames 2.

More specifically, the support bracket 50 is attached onto an upper surface of a rear end of the upper rail 11, and the rear link member 51 has a longitudinally central region (pivoted portion) pivotally supported by the support bracket 50 through a support shaft 54. That is, the rear link member 51 is supported by the support bracket 50 in a swingable manner about the support shaft 54. The rear link member 51 has a front end (engaged portion) slidably engaged with a guide groove 55 (serving as a sliding drive portion) formed in the vehicle body-side support member 53, through an engagement pin 56. The rear end (coupling portion) of the rear link member 51 is fixed to a rod-shaped rear connection member 27 disposed to connect between respective rear regions of the right and left seat-cushion frames 2. That is, the rear link member 51 is coupled to a rear end of the seat-cushion frame 2 through the rear connection member 27.

The vehicle body-side support member 53 has a front wall 57, a rear wall 58, a bottom wall 59 connecting between respective lower edges of the front and rear walls 57, 58, and a sidewall plate 60 fixed to respective laterally inward edges of the front and rear walls 57, 58 and the bottom wall 59. The sidewall plate 60 serves as an extension portion which extends downwardly from a longitudinally central region of the lower rail 10, in side view. The sidewall plate 60 serves as an extension portion is formed with a guide groove 55 which has an inclined portion with a frontwardly-downward inclination, and two horizontal portions extending approximately horizontally from respective ones of front and rear ends of the inclined portion, and each having a predetermined length.

Figure 16:
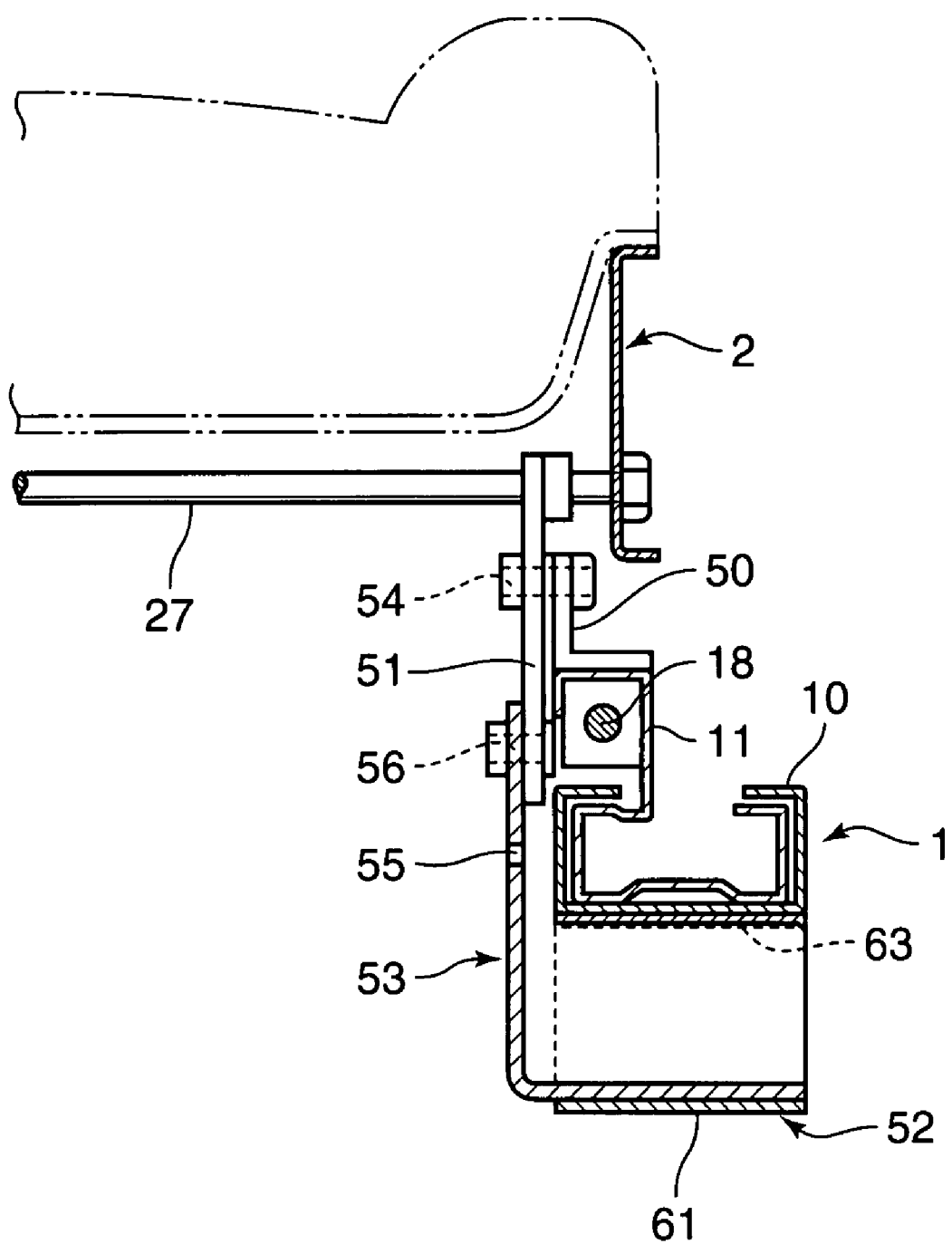
FIG. 16 is a sectional view taken along the line XVI-XVI in FIG. 14.

The mounting bracket 52 has a holding wall 61 holding the front and rear walls 57, 58 and the bottom wall 59 of the vehicle body-side support member 53 from below, a pair of mounting walls 62, 63 protruding from respective ones of front and rear edges of the holding wall 61. The front and rear walls 57, 58 and the bottom wall 59 of the vehicle body-side support member 53 are fixed to the holding wall 61 by fixing means, such as bolting, riveting or spot-welding, and the mounting walls 62, 63 are welded or bolted to a lower surface of the lower rail 10, in such a manner that the sidewall plate 60 of the vehicle body-side support member 53 is disposed on a laterally inward side relative to the seat slide rail 1 and attached to the lower rail 10, as shown in FIG. 16. Further, the sidewall plate 60 of the vehicle body-side support member 53 and a laterally inward sidewall of the lower rail 10 are disposed to defined therebetween a gap for arranging the rear link member 51. The rear link member 51 is disposed between the sidewall plate 60 of the vehicle body-side support member 53 and the seat-cushion frame 2, and within the gap.

The engagement pin 56 of the rear link member 51 is slidably engaged with the guide groove 55 (serving as a sliding drive portion) formed in the sidewall plate 60 of the vehicle body-side support member 53. Thus, during a longitudinal movement of the seat-cushion frame 2, the engagement pin 56 provided at the front end of the rear link member 51 is slidingly displaced along the guide groove 55 formed in the vehicle body-side support member 53 to swingingly displace the rear link member 51 about the support shaft 54 provided in the upper rail 11 so as to drivingly lift/lower the rear end of the seat-cushion frame 2.

Figure 17:
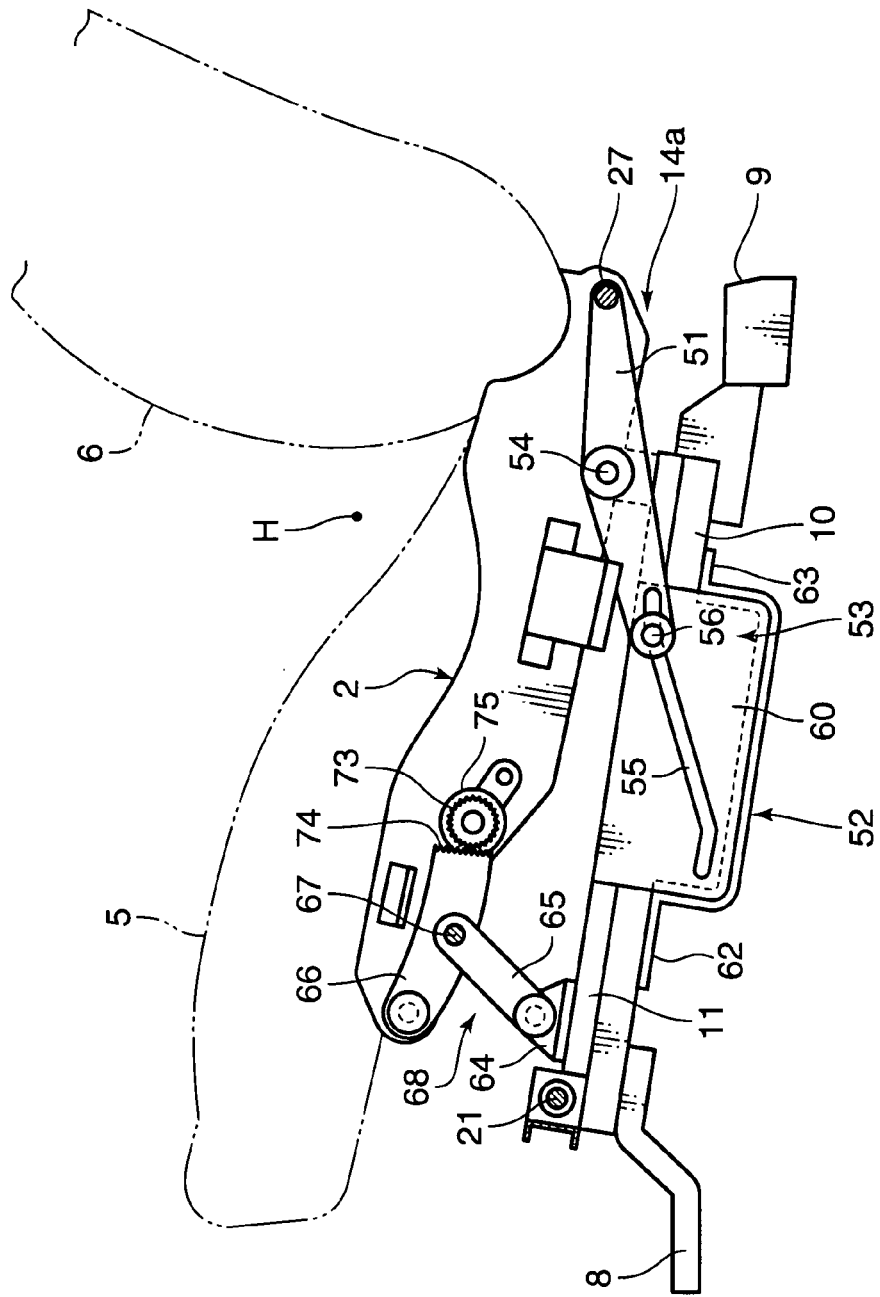
FIG. 17 is a sectional side view of the vehicle seat assembly in FIG. 13, in a state after a seat cushion is moved rearwardly.
Figure 18:
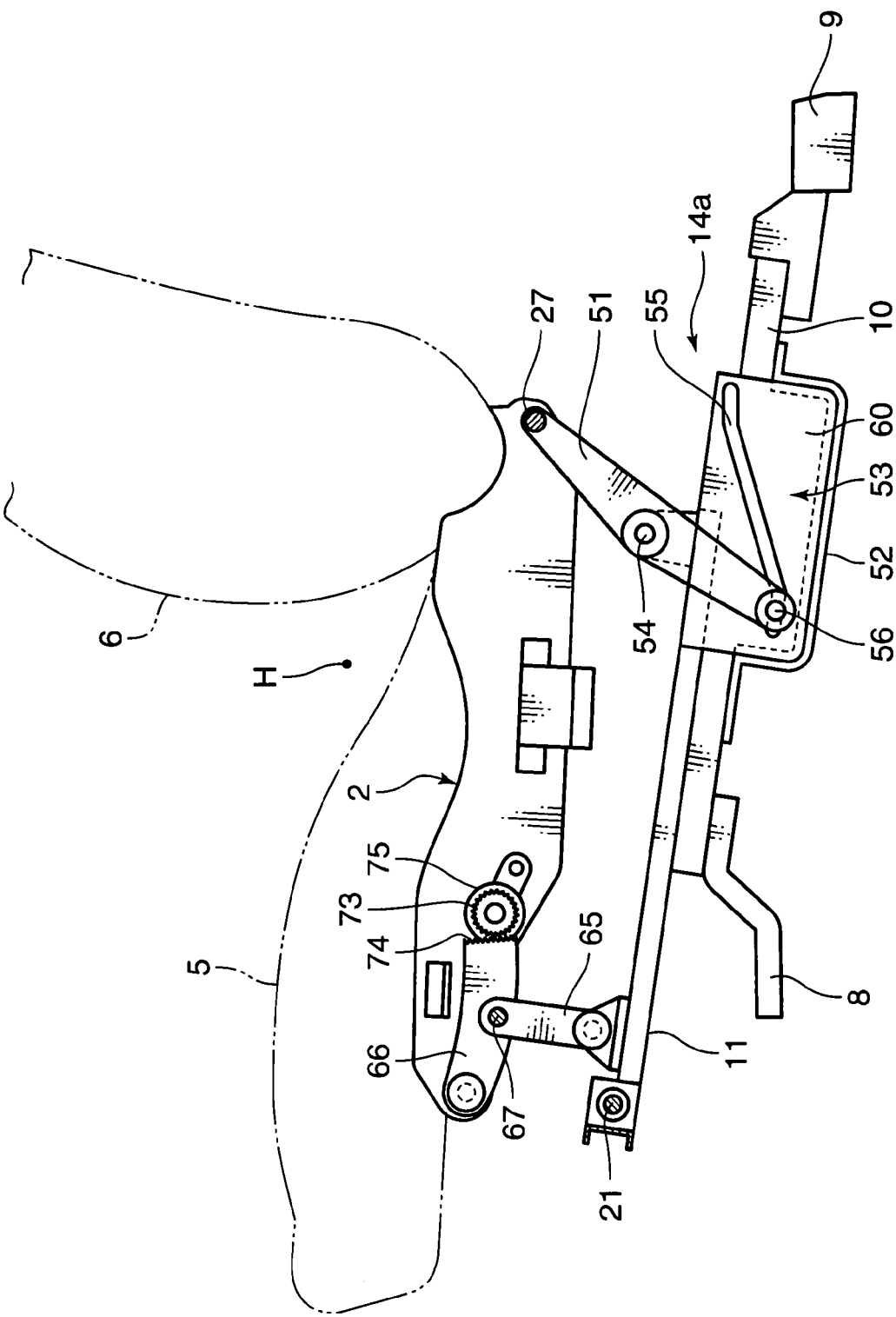
FIG. 18 is a sectional side view of the vehicle seat assembly in FIG. 13, in a state after the seat cushion is moved frontwardly.

Specifically, as shown in FIG. 17, given that the upper rail 11 and the seat-cushion frame 2 is located at a rearmost position of the seat slide rail 1, and thereby the engagement pin 56 provided at the front end of the rear link member 51 is located at a rearmost end of the guide groove 55. In this state, when a seat drive mechanism 13 is activated to drive the upper rail 11 and the seat-cushion frame 2 so as to slidingly displace the upper rail 11 and the seat-cushion frame 2 in the frontward direction of the vehicle body, the engagement pin 56 is slidingly displaced along the guide groove 55, so that the front end of the rear link member 51 is gradually moved downwardly according to guide of the guide groove 55, and thereby the rear link member 51 is swingingly displaced toward a standing position thereof about the support shaft 54. According to the swinging displacement of the rear link member 51, the rear connection member 27 coupled with the rear end of the rear link member 51 is displaced upwardly, and thereby the rear end of the seat-cushion frame 2 is pushed upwardly, as shown in FIG. 18.

As above, in the vehicle seat assembly according to the second embodiment, the rear link member 51 is formed as an arm-shaped member which has a central region provided with the pivoted portion associated with the upper rail 11 (pivoted portion associated with the pivot shaft 54), and opposite ends provided, respectively, with the coupled portion associated with the seat-cushion frame 2 (coupled portion associated with the rear connection member 27) and the engaged portion associated with the vehicle body-side support member 53 (engaged portion associated with the engagement pin 56). The vehicle body-side support member 53 includes the sidewall plate 60 (serving as an extension portion) extending downwardly from the longitudinally central region of a corresponding one of the lower rails, in side view. Further, the extension portion is provided with the sliding drive portion (guide groove 55) having a frontwardly-downward inclination. This makes it possible to drivingly lift/lower the rear end of a seat cushion 5 in an adequate manner so as to effectively move a hip point corresponding to a hip joint of an occupant sitting on the seat cushion 5, upwardly and downwardly, in a simple structure.

Specifically, the extension portion of the vehicle body-side support member 53 in engagement with the engaged portion (front end) of the rear link member 51 is disposed to extend downwardly from the lower rail 10. Thus, through effective utilization of a space defined below the seat slide rail 1, the vehicle body-side support member 53 can be disposed in the space, even if the vehicle body-side support member 53 is formed in a large size enough to allow an area for the sliding drive portion (guide groove 55) and an overall length of the rear link member 51 to be increased. This provides advantages of being able to ensure a sufficient upward/downward movement distance of the seat cushion 5 without the need for setting a longitudinal movement distance of the seat cushion 5 at an extremely large value, and to variously change a movement locus of the rear end (coupling portion associated with the rear connection member 27) of the rear link member 51 for drivingly lifting/lowering the rear end of the seat cushion 5, according to the sliding drive portion (guide groove 55) formed in the extension portion of the vehicle body-side support member 53, while preventing the occurrence of undesirable situations where the vehicle body-side support member 53 is significantly exposed to an occupant compartment to cause deterioration in appearance, and a cover member for covering the vehicle body-side support member 53 hinders an occupant from sitting on an occupant seat from a lateral side thereof.

In the vehicle seat assembly according to the second embodiment, the extension portion of the vehicle body-side support member 53 formed with the guide groove 55 serving as a sliding drive portion is disposed on a laterally inward side relative to each of the seat slide rails 1 to allow the extension portion to be hidden by the seat slide rail 1. This provides advantages of being able to achieve enhanced appearance in a simple structure without using an additional cover for covering the sidewall plate 60 of the vehicle body-side support member 53 formed with the guide groove 55 serving as a sliding drive portion, and to lay out the sliding drive portion in a compact manner through the use of a dead space defined below the seat cushion 5.

Figure 19:
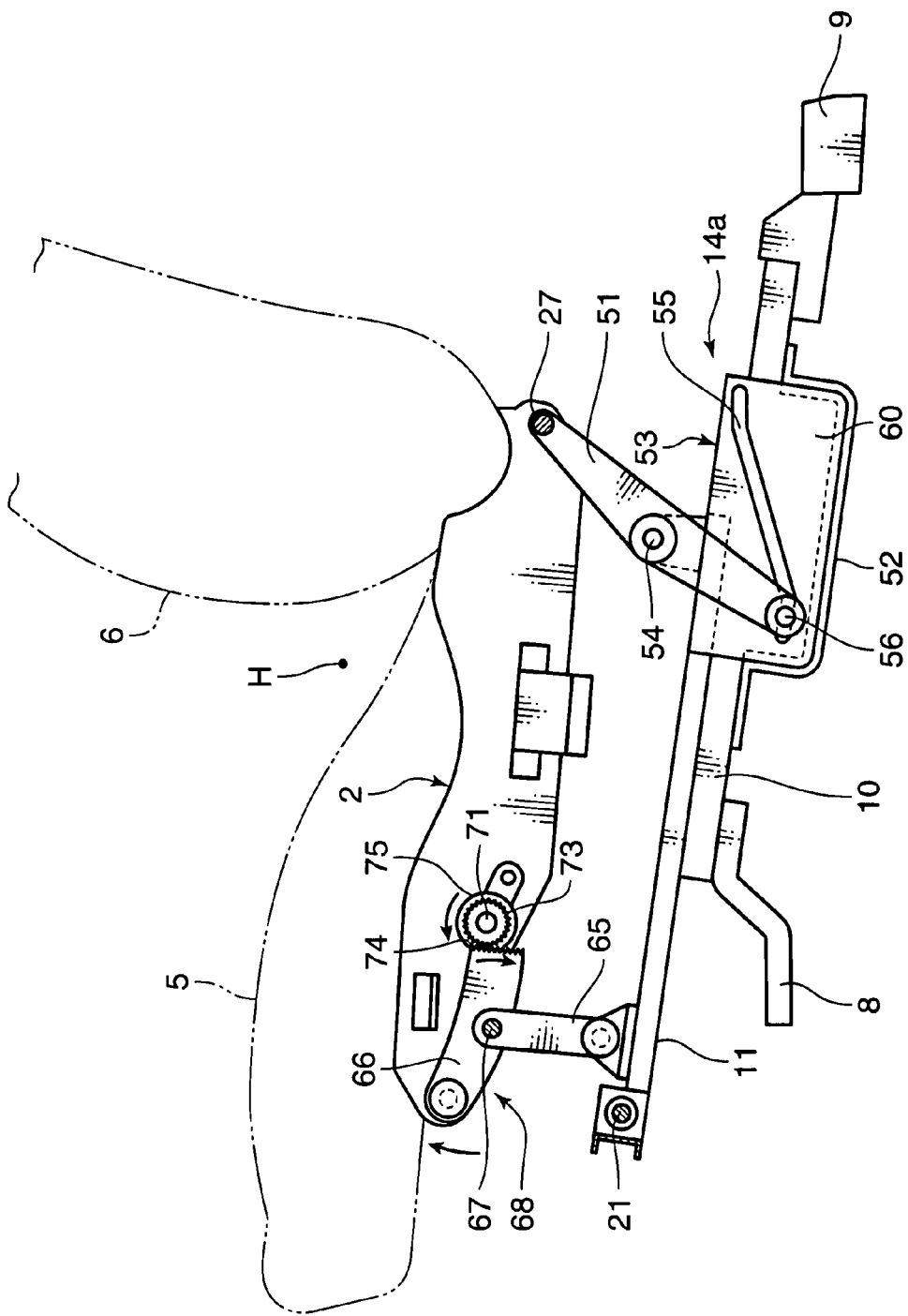
FIG. 19 is a sectional side view of the vehicle seat assembly in FIG. 13, in a state after a front end of the seat cushion is lifted.
Figure 20:
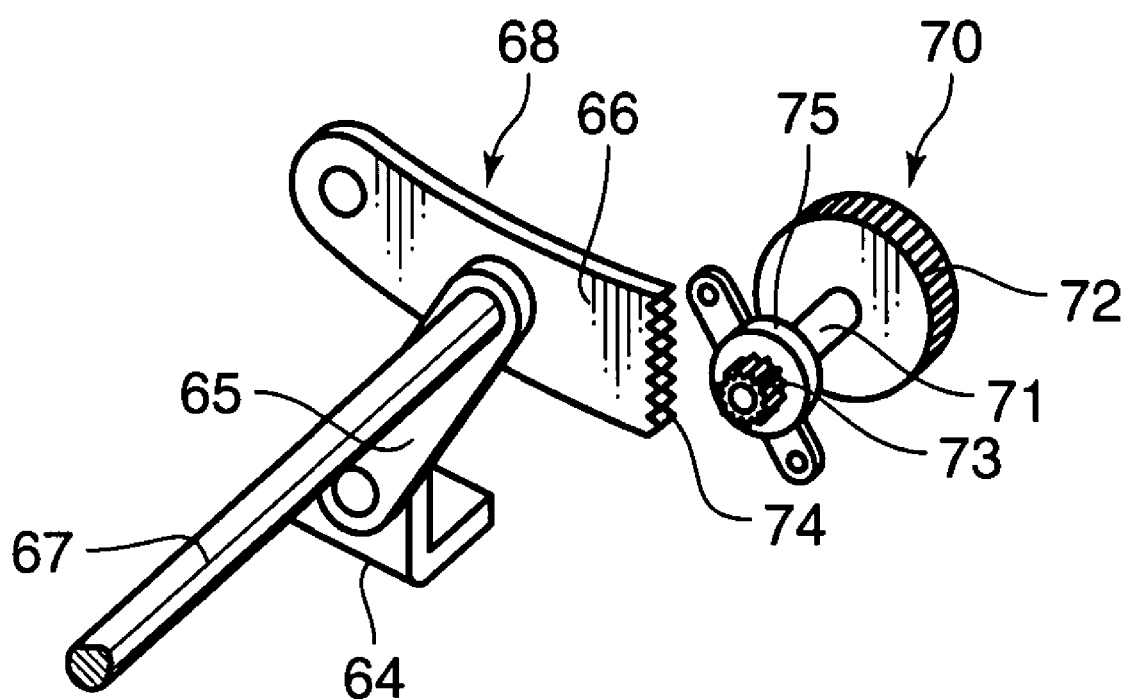
FIG. 20 is a perspective view showing a specific structure of an angle adjustment mechanism in the vehicle seat assembly in FIG. 13.

As shown in FIGS. 19 and 20, in the vehicle seat assembly according to the second embodiment, each of the right and left seat-cushion frames 2 has an upper edge directly fixed to a lower surface of a corresponding one of right and left sidewalls of a seat-cushion pan 4 (see FIG. 16), and a front region provided with a first link 65 having a base end pivotally supported by a support bracket 64 attached to an upper surface of a front end of the upper rail 11, a second link 66 having a base end pivotally supported by a laterally inward surface of a front end of the seat-cushion frame 2, and a coupling bar 67 coupling a distal end of the first link 65 to a central region of the second link 66. The first and second links 65, 66 in the right and left cushion frames 2 are coupled together by the coupling bar 67, to form a coupled link mechanism 68 serving as a coupling member. Thus, when the seat drive mechanism 13 is activated to move the cushion frame 2 in the longitudinal (frontward/rearward) direction along the lower rail 10, and the lifting/lowering drive mechanism 14 operates to drivingly lift/lower the rear end of the seat-cushion frame 2, the first link 65 is swingingly displaced about the base end (pivoted portion) to allow the seat-cushion frame 2 to be swingingly displaced about the coupling bar 67 provided at the distal end (upper end) of the first link 65.

The front region of the seat-cushion frames 2 having the coupled link mechanism 68 (in this embodiment, the right seat-cushion frame 2 is also provided with an angle adjustment mechanism 70 adapted to change a coupling angle between the first link 65 and the second link 66 so as to lift/lower a front end of the seat cushion 5 to adjust an angular position of the seat cushion 5. The angle adjustment mechanism 70 includes a rotary shaft 71 rotatably supported by the seat-cushion frame 2, a manual operation handle 72 adapted to allow an occupant to manually rotate the rotary shaft 71, and a drive gear 73 fixed to a distal end of the rotary shaft 71. The drive gear 73 is disposed to mesh with a sector gear 74 formed in a distal end of the second link 66.

The rotary shaft 71 is provided with an anti-reverse-rotation mechanism 75, such as a conventional drum brake, which is adapted to allow a rotational motion of the manual operation handle 72 to be transmitted to the drive gear 73 through the rotary shaft 71, and prevent a rotational motion which is input from the sector gear 74 into the drive gear 73 due to a weight of the seat cushion 5 and others, from being transmitted toward a base end of the rotary shaft 71 (toward the manual operation handle 72) so as to restrict a swinging displacement (swing motion) of the second link 66.

In a normal state, the swinging displacement of the second link 66 is inhibited by a restriction force of the anti-reverse-rotation mechanism 75, to keep the coupling angle between the first and second links 65, 66 at a constant value so as to prevent the front end of the seat-cushion frame 2 from being displaced in an upward/downward direction. When an occupant manually rotates the manual operation handle 72, for example, in a counterclockwise direction, the rotational motion is transmitted to the drive gear 73 through the rotary shaft 71 as indicated by the arrow in FIG. 19 to drivingly rotate the drive gear 73. Thus, the sector gear 74 is driven to swingingly displace the second link 66 from a position illustrated in FIG. 18 to a position illustrated in FIG. 19, about the coupling bar 67, so as to urge the front end of the second link 65, i.e., the front end of the seat-cushion frame 2, upwardly.

When the front end of the right seat-cushion frame 2 is urged upwardly, the urging force is transmitted to an opposite (left) one of the seat-cushion frames 2 through a coupling rod 67 to drivingly displace the left seat-cushion frame 2 simultaneously with the right seat-cushion frame 2. Thus, the seat-cushion frame 2 can be swingingly displaced about the rear connection member 27 provided at the rear end of the seat-cushion frame 2 to change the angular position of the seat cushion 5.

Third Embodiment

Figure 21:
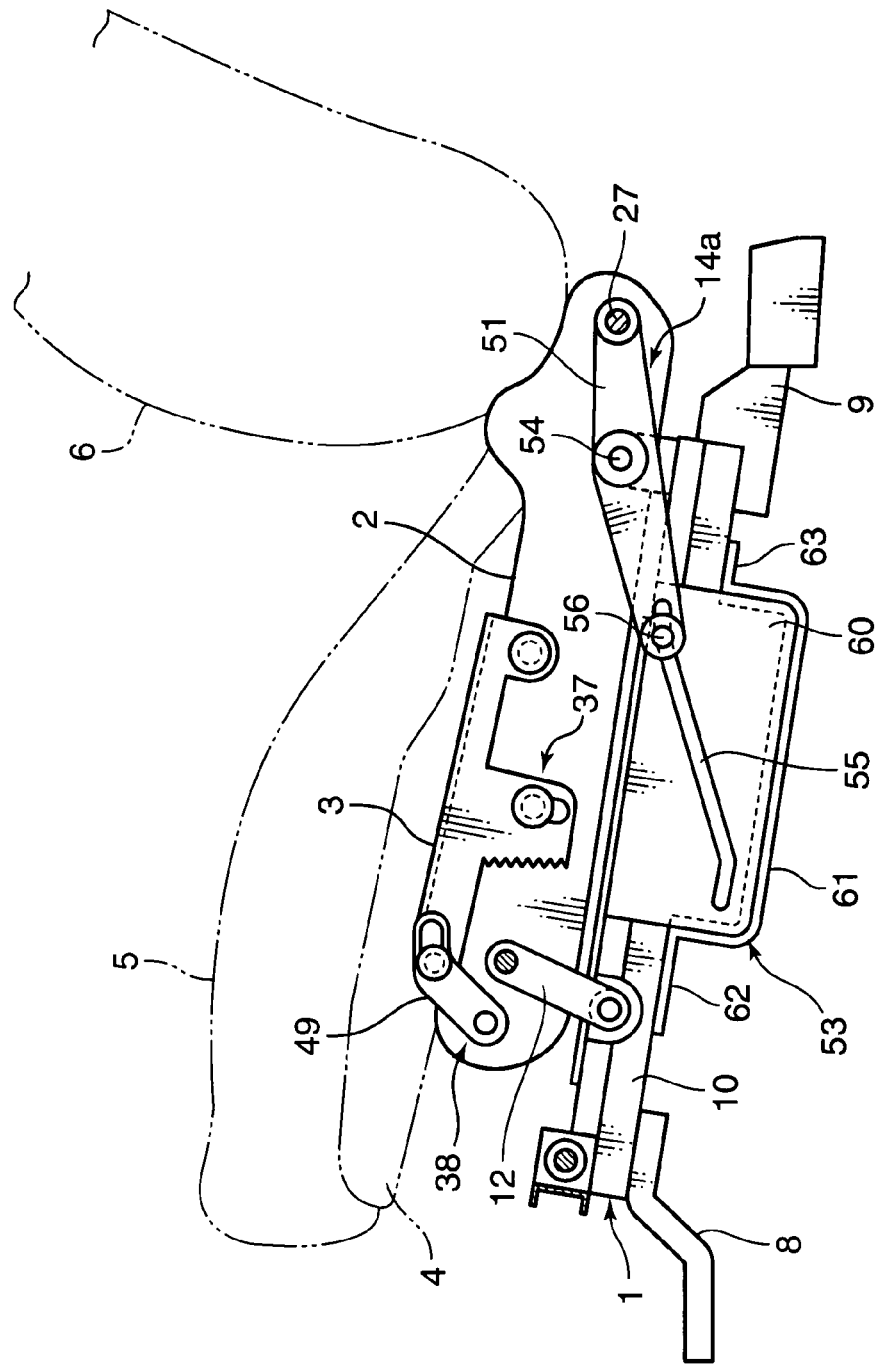
FIG. 21 is a side view showing a vehicle seat assembly according to a third embodiment of the present invention.
Figure 22:
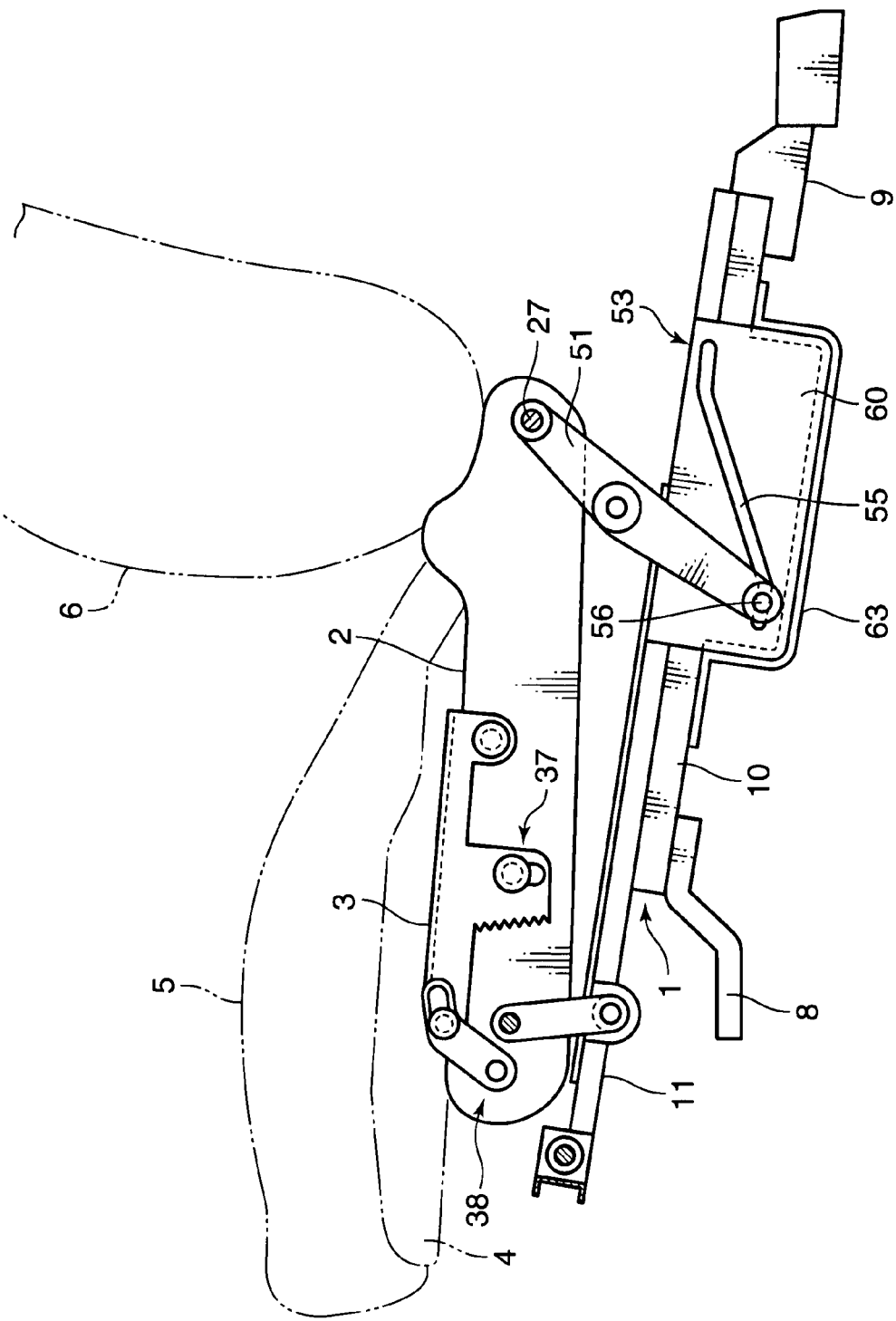
FIG. 22 is a side view of the vehicle seat assembly in FIG. 21, in a state after a seat cushion is moved frontwardly.
Figure 23:
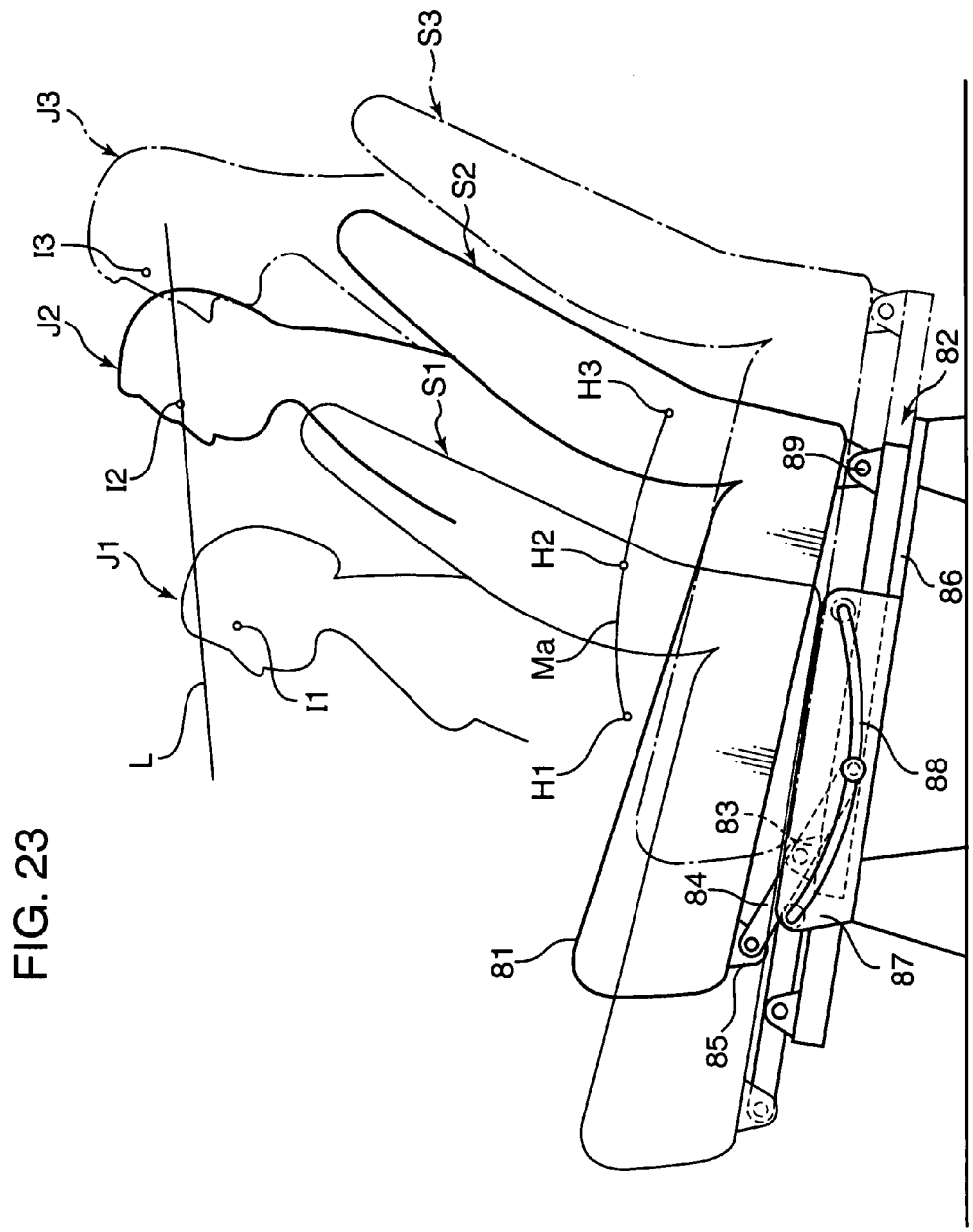
FIG. 23 is an explanatory diagram showing one example of a conventional vehicle seat assembly.

FIGS. 21 and 22 show a vehicle seat assembly according to a third embodiment of the present invention. In FIGS. 21 and 22, the same element or component as that in the first and second embodiments is defined by the same reference numeral or code, and its detailed description will be omitted. In the vehicle seat assembly according to the third embodiment, the lifting/lowering drive mechanism in the second embodiment, i.e., the lifting/lowering drive mechanism 14a comprising the rear link member 51 formed as the arm-shaped member, is provided in a rear end of each of right and left seat-cushion frames 2, and the angle adjustment mechanism in the first embodiment, i.e., the angle adjustment mechanism 37 adapted to swingingly displace the seat-cushion support member 3 about the pivot member 36 pivotally mounting the seat-cushion support member 3 to the seat-cushion frame 2 so as to adjust an angular position of the seat cushion 5, is provided in a front region of the seat-cushion frame 2.

In the vehicle seat assembly according to the third embodiment, after an upward/downward position of the rear end of the seat-cushion frame 2 is adjusted in conjunction of the longitudinal movement of the seat cushion 5 by the rear link member 51 provided in the rear end of the seat-cushion frame 2, so as to adjust a longitudinal position and an angular position of the seat cushion 5, the seat-cushion support member 3 can be swingably displaced through the angle adjustment mechanism 37. Thus, the angular position of the seat cushion 5 can be arbitrarily adjusted according to occupant's preference to advantageously obtain a stable seated posture. Further, the pivot member 36 associated with the seat-cushion frame 2 is provided in the rear end of the seat-cushion support member 3, and the angle adjustment mechanism 37 is disposed frontwardly relative to the pivot member 36. Thus, when an occupant sits on the seat cushion 5 supported by the seat-cushion frame 2 through the seat-cushion support member 3, even if a large load is applied to the seat cushion 5 in a rearward direction, the pivot member 36 can prevent the large load from directly acting on the angle adjustment mechanism 37. This provides an advantage of being able to effectively prevent instability in support of the seat cushion 5 so as to obtain a stable support state.

In summary, according to the present invention (original claim 1), a vehicle seat assembly which comprises: a pair of right and left seat slide rails including a pair of right and left lower rails each fixed onto a floor portion of an occupant compartment to extend in a longitudinal direction of a vehicle body, and a pair of right and left upper rails slidably supported along corresponding ones of the lower rails; and a pair of right and left seat-cushion frames each supported by a corresponding one of the seat slide rails in such a manner as to be moved in the longitudinal direction together with a corresponding one of the upper rails. The vehicle seat assembly is characterized by comprising a coupling member coupling a front end of each of the seat-cushion frames to a corresponding one of the upper rails, a rear link member provided in a rear end of each of the seat-cushion frames, and a vehicle body-side support member provided on the side of the vehicle body to support the rear link member. The rear link member includes a pivoted portion pivotally supported by the upper rail, a coupled portion coupled to the rear end of the seat-cushion frame, and an engaged portion engaged with the vehicle body-side support member. The vehicle body-side support member includes a sliding drive portion which slidably supports the engaged portion of the rear link member to allow the rear link member to be swingingly displaced about the pivoted portion in conjunction with a longitudinal movement of the seat-cushion frame, so as to move the coupled portion of the rear link member in an upward/downward direction to drivingly lift and lower the rear end of the seat-cushion frame.

With the vehicle seat assembly set forth in the above, when the seat-cushion frames of the seat cushion are moved in the longitudinal direction, each of the rear link members is swingingly displaced about the pivoted portion to drivingly lift/lower a rear end of the seat cushion, as the engaged portion of the rear link member is slidingly displaced along the sliding drive portion of the vehicle body-side support member. This provides advantages of allowing a hip point corresponding to a position of a hip joint of an occupant sitting on the seat cushion to be effectively moved in an upward/downward direction, while variously changing a movement locus of the hip point according to a configuration/arrangement of the sliding drive portion and a pattern/mode of the sliding displacement of the rear link member.

In the aforementioned vehicle seat assembly (original claim 2), the pivoted portion associated with the upper rail may be provided in a front region of the rear link member, and the coupled portion associated with the seat-cushion frame may be provided in a rear upper region of the rear link member. Further, the engaged portion associated with the vehicle body-side support member may be provided in a lower region of the rear link member. Thus, the rear link member can be swingingly displaced in conjunction with the longitudinal (i.e., frontward/rearward) movement of the seat cushion to drivingly lift/lower the rear end of the seat cushion in a significant manner. This makes it possible to effectively move the hip point for an occupant in the upward/downward direction, according to the swinging displacement of the rear link member, without taking disadvantageous measures, for example, extremely increasing a lever ratio of the rear link member, and without the occurrence of wobbling in the seat cushion.

In the aforementioned vehicle seat assembly (original claim 3), the rear link member may be formed in an approximately triangular shape in side view, and the pivoted portion, the coupled portion and the engaged portion are provided in three apex regions of the rear link member, respectively. This provides an advantage of being able to drivingly lift/lower the rear end of the seat-cushion frame effectively in a compact configuration while preventing the regions of the rear link member from interfering with a peripheral member of the vehicle seat assembly. In addition, even if the rear link member is disposed below the rear end of the seat cushion, interference between a lower edge of the rear link member and a floor surface can be advantageously avoided without taking costly measures, for example, lowering a position of a floor panel.

In the aforementioned vehicle seat assembly (original claim 4), a positional relationship of the pivoted portion, the coupled portion and the engaged portion provided in the rear link member may be set such that, when the rear link member is moved to a lift position for drivingly lifting the seat-cushion frame, the coupled portion associated with the seat-cushion frame is displaced to be located in an uppermost apex region of the rear link member formed in an approximately triangular shape in side view. This provides an advantage of being able to effectively prevent the coupling portion of the rear link member from interfering with the seat-cushion frame, a seat-cushion pan of the seat cushion or the like, during a frontward movement of the seat-cushion frame.

In the aforementioned vehicle seat assembly (original claim 5), the vehicle body-side support member may be formed with a gentle S-shaped sliding groove having, in side view, an upward inclination which gently increases and then gently decreases in a direction from a rear end to a front end of the vehicle seat assembly, wherein the engaged portion of the rear link member is slidably engaged with the sliding groove.

With the vehicle seat assembly as mentioned above, the engaged portion of the rear link member can be slidingly displaced along the sliding groove having a gentle S-shaped pass with a frontwardly-upward inclination, in conjunction with the longitudinal movement of the seat cushion, to drivingly lift/lower the rear end of the seat cushion in a significant manner, so as to displace the hip point for an occupant sitting on the seat cushion, along a gentle S-shaped locus. This provides an advantage of being able to adequately change a seating posture and a position of a visual point of the occupant in conformity to the physique of the occupant, without increasing a longitudinal movement distance of the occupant seat.

In the aforementioned vehicle seat assembly (original claim 6), the vehicle body-side support member may be formed with a sliding groove having, in side view, an inclination which linearly increases in a direction from a rear end to a front end of the vehicle seat assembly, wherein the engaged portion of the rear link member is slidably engaged with the sliding groove.

With the vehicle seat assembly as mentioned above, the engaged portion of the rear link member can be slidingly displaced along the sliding groove having a linear and frontwardly-upward inclination, in conjunction with the longitudinal movement of the seat cushion, so as to swingingly displace the rear link member in a smooth manner. This provides an advantage of being able to drivingly lift/lower the rear end of the seat cushion readily without the need for a large driving force.

In the aforementioned vehicle seat assembly (original claim 7), the connection member connecting between the respective rear ends of the pair of right and left seat-cushion frames is provided, and the coupled portion of the rear link member is coupled to the connection member. This provides an advantage of being able to couple the right and left seat-cushion frames together in a simple configuration without using additional means for coupling the coupled portion of the rear link member to the seat-cushion frame, such as a coupling pin. In addition, the connection member makes it possible to ensure sufficient stiffness in the rear end of the seat-cushion frame, so as to provide an advantage of be able to drivingly lift/lower the rear end of the seat-cushion frame in a smooth manner.

In the aforementioned vehicle seat assembly (original claim 8), the vehicle seat assembly may further comprise a seat-cushion support member disposed in a front end of each of the seat-cushion frames to support a seat cushion, a pivot member pivotally mounting the seat-cushion support member to the seat-cushion frame, and an angle adjustment mechanism adapted to swingingly displace the seat-cushion support member about the pivot member so as to adjust an angular position of the seat cushion.

With the vehicle seat assembly as mentioned above, after an upward/downward position of the rear end of the seat-cushion frame is adjusted in conjunction of the longitudinal movement of the seat cushion by the rear link member provided in the rear end of the seat-cushion frame, so as to adjust a longitudinal position and an angular position of the seat cushion, the seat-cushion support member can be swingably displaced through the angle adjustment mechanism. Thus, the angular position of the seat cushion can be arbitrarily adjusted according to occupant's preference to advantageously obtain a stable seated posture.

In the aforementioned vehicle seat assembly (original claim 9), the pivot member associated with the seat-cushion frame may be provided in a rear end of the seat-cushion support member, and the angle adjustment mechanism is disposed frontwardly relative to the pivot member. Thus, when an occupant sits on the seat cushion supported by the seat-cushion frame through the seat-cushion support member, even if a large load is applied to the seat cushion in a rearward direction, the pivot member associated with the cushion frame can support the load to prevent the large load from acting on the angle adjustment mechanism. This provides an advantage of being able to effectively prevent the occurrence of an undesirable situation where a supporting state of the seat cushion becomes unstable due to wobbling or the like occurring in the angle adjustment mechanism, so as to stably support the seat cushion.

In the aforementioned vehicle seat assembly (original claim 10), the angle adjustment mechanism is associated with a first one of the seat-cushion support members disposed on right and left sides of the seat cushion, and the vehicle seat assembly includes a motion-transmitting mechanism adapted to transmit a motion input into the first seat-cushion support member from the angle adjustment mechanism, to a second one of the seat-cushion support members so as to swingingly displace the second seat-cushion support member. This provides an advantage of being able to swingingly displace the right and left seat-cushion support members in a simultaneous manner so as to adequately adjust the angular position of the seat cushion.

In the aforementioned vehicle seat assembly (original claim 11), the motion-transmitting mechanism may include a pair of right and left front link members each having a base end pivotally supported by a corresponding one of the seat-cushion frames and a distal end coupled to a corresponding one of the seat-cushion support members; and an interlock member interlockingly connecting between the respective base ends of the coupling link members. The motion-transmitting mechanism is operable to transmit a motion input into the first seat-cushion support member and a first one of the front link members from the angle adjustment mechanism, to a second one of the front link members and the second seat-cushion support member through the interlock member so as to swingingly displace the second seat-cushion support member simultaneously with the first seat-cushion support member.

This provides an advantage of being able to lay out the motion-transmitting mechanism in a compact manner through effective utilization of a dead space defined below the front end of the seat cushion.

In the aforementioned vehicle seat assembly (original claim 12), the rear link member can be formed as an arm-shaped member which has a central region provided with the pivoted portion associated with the upper rail, and opposite ends provided, respectively, with the coupled portion associated with the seat-cushion frame and the engaged portion associated with the vehicle body-side support member. The vehicle body-side support member includes an extension portion extending downwardly from a longitudinally central region of a corresponding one of the lower rails, in side view. Further, the sliding drive portion is provided in the extension portion with a frontwardly-downward inclination.

In the vehicle seat assembly as mentioned above, the extension portion of the vehicle body-side support member in engagement with the engaged portion is disposed to extend downwardly from the lower rail. Thus, through effective utilization of a space defined below the seat slide rail, the vehicle body-side support member can be disposed in the space, even if the vehicle body-side support member is formed in a large size enough to allow an area for the sliding drive portion and an overall length of the rear link member to be increased. This provides advantages of being able to ensure a sufficient upward/downward movement distance of the seat cushion without the need for setting a longitudinal movement distance of the seat cushion at an extremely large value, and to variously change a movement locus of the end of the rear link member for drivingly lifting/lowering the rear end of the seat cushion, according to the sliding drive portion formed in the extension portion of the vehicle body-side support member, while preventing the occurrence of undesirable situations where the vehicle body-side support member is significantly exposed to an occupant compartment to cause deterioration in appearance, and a cover member for covering the vehicle body-side support member hinders an occupant from sitting on the occupant seat from a lateral side thereof.

In the vehicle seat assembly (original claim 13), the vehicle body-side support member may include the sliding drive portion is disposed on a laterally inward side relative to each of the seat slide rails to allow the sliding drive portion to be hidden by the seat slide rail. This provides advantages of being able to achieve enhanced appearance in a simple structure without using an additional cover for covering the sliding drive portion, and to lay out the sliding drive portion in a compact manner through the use of a dead space defined below the seat cushion.

This application is based on 4 (four) Japanese Patent Application Serial Nos. 2006-228397, 2006-228398, 2006-228399, and 2006-228400, filed in Japan Patent Office all on Aug. 24, 2006, the contents of which are hereby incorporated by reference.

Although the present invention has been fully described by way of example with reference to the accompanying drawings, it is to be understood that various changes and modifications depart from the scope of the present invention hereinafter defined, they should be construed as being included therein.

What is claimed is:

1. A vehicle seat assembly comprising:
   a pair of right and left seat slide rails including:
      a pair of right and left lower rails each fixed onto a floor portion of an occupant compartment to extend in a longitudinal direction of a vehicle body, and
      a pair of right and left upper rails slidably supported along corresponding ones of said lower rails; and
   a pair of right and left seat-cushion frames each supported by a corresponding one of said seat slide rails in such a manner as to be moved in said longitudinal direction together with a corresponding one of said upper rails,
   a coupling member coupling a front end of each of said seat-cushion frames to a corresponding one of said upper rails;
   a rear link member provided in a rear end of each of said seat-cushion frames; and
   a vehicle body-side support member provided on the side of the vehicle body to support said rear link member, wherein:
   said rear link member including:
      a pivoted portion pivotally supported by said upper rail,
      a coupled portion coupled to the rear end of said seat-cushion frame, and
      an engaged portion engaged with said vehicle body-side support member; and
   said vehicle body-side support member including:
      a sliding drive portion which slidably supports said engaged portion of said rear link member to allow said rear link member to be swingingly displaced about said pivoted portion in conjunction with a longitudinal movement of said seat-cushion frame, so as to move said coupled portion of said rear link member in an upward/downward direction to drivingly lift and lower the rear end of said seat-cushion frame.

2. The vehicle seat assembly as defined in claim 1, wherein:
   said pivoted portion associated with said upper rail is provided in a front region of said rear link member;
   said coupled portion associated with said seat-cushion frame is provided in a rear upper region of said rear link member; and
   said engaged portion associated with said vehicle body-side support member is provided in a lower region of said rear link member.

3. The vehicle seat assembly as defined in claim 2, wherein said rear link member is formed in an approximately triangular shape in side view, wherein said pivoted portion, said coupled portion and said engaged portion are provided in three apex regions of said rear link member, respectively.

4. The vehicle seat assembly as defined in claim 3, wherein a positional relationship of said pivoted portion, said coupled portion and said engaged portion provided in said rear link member is set such that, when said rear link member is moved to a lift position for drivingly lifting said seat-cushion frame, said coupled portion associated with said seat-cushion frame is displaced to be located in an uppermost apex region of said rear link member formed in an approximately triangular shape in side view.

5. The vehicle seat assembly as defined in claim 2, wherein said vehicle body-side support member is formed with a gentle S-shaped sliding groove having, in side view, an upward inclination which gently increases and then gently decreases in a direction from a rear end to a front end of said vehicle seat assembly, wherein said engaged portion of said rear link member is slidably engaged with said sliding groove.

6. The vehicle seat assembly as defined in claim 2, wherein said vehicle body-side support member is formed with a sliding groove having, in side view, an inclination which linearly increases in a direction from a rear end to a front end of said vehicle seat assembly, wherein said engaged portion of said rear link member is slidably engaged with said sliding groove.

7. The vehicle seat assembly as defined in claim 1, further comprising a connection member connecting between the respective rear ends of said pair of right and left seat-cushion frames, wherein said coupled portion of said rear link member is coupled to said connection member.

8. The vehicle seat assembly as defined in claim 1, further comprising:
   a seat-cushion support member disposed in a front end of each of said seat-cushion frames to support a seat cushion;
   a pivot member pivotally mounting said seat-cushion support member to said seat-cushion frame; and
   an angle adjustment mechanism adapted to swingingly displace said seat-cushion support member about said pivot member so as to adjust an angular position of said seat cushion.

9. The vehicle seat assembly as defined in claim 8, wherein:
   said pivot member associated with said seat-cushion frame is provided in a rear end of said seat-cushion support member; and
   said angle adjustment mechanism is disposed frontwardly relative to said pivot member.

10. The vehicle seat assembly as defined in claim 9, further comprising a motion-transmitting mechanism, wherein said angle adjustment mechanism is associated with one of said seat-cushion support members disposed on right and left sides of said seat cushion, wherein said motion-transmitting mechanism transmits a motion input to said one of said seat-cushion support members from said angle adjustment mechanism, to the other one of said seat-cushion support members so as to swingingly displace said other one of seat-cushion support members.

11. The vehicle seat assembly as defined in claim 10, wherein said motion-transmitting mechanism includes: a pair of right and left front link members each having a base end pivotally supported by a corresponding one of said seat-cushion frames and a distal end coupled to a corresponding one of said seat-cushion support members; and an interlock member interlockingly connecting between the respective base ends of said front link members, said motion-transmitting mechanism being operable to transmit a motion input to said one of said seat-cushion support members and one of said front link members from said angle adjustment mechanism, to the other one of said front link members and said the other one of seat-cushion support members through said interlock member so as to swingingly displace said the other one of seat-cushion support members simultaneously with said one of said seat-cushion support members.

12. The vehicle seat assembly as defined in claim 1, wherein:
   said rear link member is formed as an arm-shaped member which has a central region provided with said pivoted portion associated with said upper rail, and opposite ends provided, respectively, with said coupled portion associated with said seat-cushion frame and said engaged portion associated with said vehicle body-side support member; and said vehicle body-side support member includes an extension portion extending downwardly from a longitudinally central region of a corresponding one of said lower rails, in side view,
wherein said sliding drive portion is provided in said extension portion with a frontwardly-downward inclination.

13. The vehicle seat assembly as defined in claim 1, wherein said vehicle body-side support member including said sliding drive portion is disposed on a laterally inward side relative to each of said seat slide rails.

* * * * *